US010498933B2

(12) United States Patent
Nunnink et al.

(10) Patent No.: US 10,498,933 B2
(45) Date of Patent: Dec. 3, 2019

(54) CAMERA SYSTEM WITH EXCHANGEABLE ILLUMINATION ASSEMBLY

(75) Inventors: Laurens Nunnink, Simpleveld (NL); Richard Reuter, Wurselen (DE)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 13/302,858

(22) Filed: Nov. 22, 2011

(65) Prior Publication Data
US 2013/0128104 A1    May 23, 2013

(51) Int. Cl.
*G03B 15/05* (2006.01)
*H04N 5/225* (2006.01)

(52) U.S. Cl.
CPC .......... *H04N 5/2252* (2013.01); *G03B 15/05* (2013.01); *G03B 2215/0517* (2013.01); *G03B 2215/0567* (2013.01); *G03B 2215/0575* (2013.01)

(58) Field of Classification Search
USPC ............... 348/373, 371; 235/462.42, 462.47; 396/199, 529–530
See application file for complete search history.

(56) References Cited

U.S. PATENT DOCUMENTS

| | | | |
|---|---|---|---|
| 1,873,149 A * | 8/1932 | Perez | 359/385 |
| 2,409,328 A * | 10/1946 | Wilder | 353/39 |
| 3,682,069 A | 8/1972 | Lecoeur | |
| 3,709,132 A | 1/1973 | Farrell et al. | |
| 3,940,777 A | 2/1976 | Komine | |
| 4,072,396 A | 2/1978 | Ross | |
| 4,160,590 A | 7/1979 | Reynard | |

(Continued)

FOREIGN PATENT DOCUMENTS

| | | |
|---|---|---|
| CN | 1230815 A | 10/1999 |
| CN | 101027794 A | 8/2007 |

(Continued)

OTHER PUBLICATIONS

Nunnink, "U.S. Appl. No. 13/302,751, Vision System Camera With Mount for Multiple Lens Types", Nov. 22, 2011

(Continued)

*Primary Examiner* — Sinh Tran
*Assistant Examiner* — Quan Pham
(74) *Attorney, Agent, or Firm* — Loginov & Associates

(57) ABSTRACT

This invention provides a vision system with an exchangeable illumination assembly that allows for increased versatility in the type and configuration of illumination supplied to the system without altering the underlying optics, sensor, vision processor, or the associated housing. The vision system housing includes a front plate that optionally includes a plurality of mounting bases for accepting different types of lenses, and a connector that allows removable interconnection with the illustrative illumination assembly. The illumination assembly includes a cover that is light transmissive. The cover encloses an illumination component that can include a plurality of lighting elements that surround an aperture through which received light rays from the imaged scene pass through to the lens. The arrangement of lighting elements is highly variable and the user can be supplied with an illumination assembly that best suits its needs without need to change the vision system processor, sensor or housing.

22 Claims, 13 Drawing Sheets

(56) References Cited

U.S. PATENT DOCUMENTS

| | | | |
|---|---|---|---|
| 4,230,403 A | 10/1980 | Hashimoto et al. | |
| 4,314,752 A | 2/1982 | Ishizaka et al. | |
| 4,451,131 A | 5/1984 | Shimizu | |
| 4,478,491 A | 10/1984 | Kawai | |
| 4,490,018 A | 12/1984 | Yokotsuka | |
| 4,494,828 A | 1/1985 | Masumoto et al. | |
| 4,591,253 A | 5/1986 | Hecker et al. | |
| 4,781,448 A | 11/1988 | Chatenever | |
| 4,864,341 A | 9/1989 | Maekawa et al. | |
| 4,871,238 A | 10/1989 | Sato et al. | |
| 4,877,949 A | 10/1989 | Danielson et al. | |
| 4,894,677 A * | 1/1990 | Bourcier et al. | 396/113 |
| 4,974,138 A * | 11/1990 | Negishi | 362/347 |
| 5,010,412 A * | 4/1991 | Garriss | H04N 5/2256 348/371 |
| 5,019,699 A | 5/1991 | Koenck | |
| 5,136,320 A | 8/1992 | Kobayashi et al. | |
| 5,155,343 A | 10/1992 | Chandler | |
| 5,245,172 A | 9/1993 | Esslinger et al. | |
| 5,245,671 A * | 9/1993 | Kobayashi et al. | 382/150 |
| 5,247,152 A | 9/1993 | Swartz et al. | |
| 5,247,162 A | 9/1993 | Swartz | |
| 5,291,232 A | 3/1994 | Kobayashi et al. | |
| 5,308,966 A | 5/1994 | Danielson et al. | |
| 5,313,053 A | 5/1994 | Koenck | |
| 5,331,176 A | 7/1994 | San't Anselmo et al. | |
| 5,331,178 A | 7/1994 | San't Anselmo et al. | |
| 5,349,172 A | 9/1994 | Roustaei | |
| 5,363,164 A | 11/1994 | Kobayashi et al. | |
| 5,365,597 A | 11/1994 | Holeva | |
| 5,378,883 A | 1/1995 | Batterman et al. | |
| 5,399,846 A | 3/1995 | Pavlidis et al. | |
| 5,478,997 A | 10/1995 | Bridgelall et al. | |
| 5,471,043 A | 11/1995 | Knapp et al. | |
| 5,473,150 A | 12/1995 | Huhn et al. | |
| 5,500,516 A | 3/1996 | Durbin | |
| 5,513,264 A | 4/1996 | Wang et al. | |
| 5,569,902 A | 10/1996 | Wood et al. | |
| 5,572,006 A | 11/1996 | Wang et al. | |
| 5,580,163 A * | 12/1996 | Johnson, II | 362/285 |
| 5,587,843 A | 12/1996 | Chen | |
| 5,596,368 A | 1/1997 | Capper et al. | |
| 5,598,007 A | 1/1997 | Bunce et al. | |
| 5,627,360 A | 5/1997 | Rudeen | |
| 5,640,001 A | 6/1997 | Danielson et al. | |
| 5,644,441 A | 7/1997 | Hirasaki et al. | |
| 5,659,167 A | 8/1997 | Wang et al. | |
| 5,672,858 A | 9/1997 | Li et al. | |
| 5,715,095 A | 2/1998 | Hiratsuka et al. | |
| 5,734,153 A | 3/1998 | Swartz et al. | |
| 5,756,981 A | 5/1998 | Roustaei et al. | |
| 5,773,810 A | 6/1998 | Hussey et al. | |
| 5,783,811 A | 7/1998 | Feng et al. | |
| 5,786,582 A | 7/1998 | Roustaei | |
| 5,786,586 A | 7/1998 | Pidhirny et al. | |
| 5,793,033 A | 8/1998 | Feng et al. | |
| 5,811,828 A | 9/1998 | Laser | |
| 5,818,528 A | 10/1998 | Roth et al. | |
| 5,821,518 A | 10/1998 | Sussmeier et al. | |
| 5,825,006 A | 10/1998 | Longacre, Jr. et al. | |
| 5,825,559 A | 10/1998 | Johnson et al. | |
| 5,834,754 A | 11/1998 | Feng et al. | |
| 5,844,229 A | 12/1998 | Rockstein et al. | |
| 5,864,128 A | 1/1999 | Plesko | |
| 5,886,338 A * | 3/1999 | Arackellian et al. | 235/472.01 |
| 5,897,195 A * | 4/1999 | Choate | 362/33 |
| 5,943,169 A | 8/1999 | Okada | |
| 5,945,658 A | 8/1999 | Salatto et al. | |
| 5,949,057 A | 9/1999 | Feng | |
| 5,969,321 A | 10/1999 | Danielson et al. | |
| 5,992,751 A | 11/1999 | Laser | |
| 6,022,124 A * | 2/2000 | Bourn et al. | 362/247 |
| 6,060,722 A | 5/2000 | Havens et al. | |
| 6,066,857 A | 5/2000 | Fantone et al. | |
| 6,073,851 A | 6/2000 | Olmstead et al. | |
| 6,098,887 A | 8/2000 | Figarella et al. | |
| 6,164,544 A | 12/2000 | Schwartz et al. | |
| 6,172,709 B1 | 1/2001 | Yamano et al. | |
| 6,179,208 B1 | 1/2001 | Feng | |
| 6,223,986 B1 | 5/2001 | Bobba et al. | |
| 6,223,988 B1 | 5/2001 | Batterman et al. | |
| 6,238,060 B1 * | 5/2001 | Bourn et al. | 362/216 |
| 6,266,196 B1 | 7/2001 | Do et al. | |
| 6,273,338 B1 * | 8/2001 | White | 235/462.42 |
| 6,318,924 B1 | 11/2001 | Schiavo | |
| 6,339,680 B1 | 1/2002 | Mauvais | |
| 6,340,114 B1 | 1/2002 | Correa et al. | |
| 6,347,163 B2 | 2/2002 | Roustaei et al. | |
| 6,385,507 B1 * | 5/2002 | Buijtels | 700/245 |
| 6,431,452 B2 | 8/2002 | Feng | |
| 6,445,450 B1 | 9/2002 | Matsumoto | |
| 6,449,430 B1 | 9/2002 | Tasaka et al. | |
| 6,474,556 B2 | 11/2002 | Dickson et al. | |
| 6,527,183 B2 | 3/2003 | Bard et al. | |
| 6,542,238 B1 * | 4/2003 | Tsuboi et al. | 356/401 |
| 6,556,355 B2 | 4/2003 | Tsutsumi | |
| 6,607,132 B1 | 8/2003 | Dvorkis et al. | |
| 6,636,298 B1 | 10/2003 | Bachelder | |
| 6,651,886 B2 | 11/2003 | Gurevich et al. | |
| 6,651,888 B1 | 11/2003 | Gurevich et al. | |
| 6,659,350 B2 | 12/2003 | Schwartz et al. | |
| 6,663,260 B1 * | 12/2003 | Tieszen | 362/249.06 |
| 6,669,093 B1 | 12/2003 | Meyerson et al. | |
| 6,681,994 B1 | 1/2004 | Koenck | |
| 6,689,998 B1 | 2/2004 | Bremer | |
| 6,712,270 B2 | 3/2004 | Leach et al. | |
| 6,729,546 B2 | 5/2004 | Roustaei | |
| 6,765,393 B2 | 7/2004 | Pierenkemper et al. | |
| 6,781,630 B2 | 8/2004 | Nomura et al. | |
| 6,805,295 B2 | 10/2004 | Barkan et al. | |
| 6,808,114 B1 | 10/2004 | Palestini et al. | |
| 6,809,847 B2 | 10/2004 | McQueen | |
| 6,827,270 B2 | 12/2004 | Yomogida et al. | |
| 6,832,725 B2 | 12/2004 | Gardiner et al. | |
| 6,832,729 B1 | 12/2004 | Perry et al. | |
| 6,837,433 B2 | 1/2005 | Jam et al. | |
| 6,845,915 B2 | 1/2005 | Krichever et al. | |
| 6,866,198 B2 | 3/2005 | Patel et al. | |
| 6,877,664 B1 | 4/2005 | Oliva et al. | |
| 6,891,679 B2 | 5/2005 | Atarashi et al. | |
| 6,918,538 B2 | 7/2005 | Breytman et al. | |
| 6,967,794 B2 | 11/2005 | Luthardt et al. | |
| 6,974,085 B1 | 12/2005 | Koenck | |
| 6,997,385 B2 | 2/2006 | Palestini et al. | |
| 7,007,843 B2 | 3/2006 | Poloniewicz | |
| 7,025,271 B2 | 4/2006 | Dvorkis et al. | |
| 7,025,272 B2 | 4/2006 | Yavid et al. | |
| 7,025,273 B2 | 4/2006 | Breytman et al. | |
| 7,042,490 B2 * | 5/2006 | Numazaki et al. | 348/131 |
| 7,055,747 B2 | 6/2006 | Havens et al. | |
| 7,063,256 B2 | 6/2006 | Anderson et al. | |
| 7,073,711 B2 | 7/2006 | Fernandez et al. | |
| 7,073,715 B2 | 7/2006 | Patel et al. | |
| 7,075,663 B2 | 7/2006 | Canini | |
| 7,077,325 B2 | 7/2006 | Tan et al. | |
| 7,090,137 B1 | 8/2006 | Bennett | |
| 7,128,266 B2 | 10/2006 | Zhu et al. | |
| 7,136,582 B2 * | 11/2006 | Hayami et al. | 396/182 |
| 7,147,159 B2 | 12/2006 | Longacre et al. | |
| 7,201,318 B2 | 4/2007 | Craen et al. | |
| 7,222,793 B2 | 5/2007 | Patel et al. | |
| 7,224,540 B2 | 5/2007 | Olmstead et al. | |
| 7,264,162 B2 | 9/2007 | Barkan | |
| 7,292,281 B2 * | 11/2007 | Cheng | 348/373 |
| 7,296,749 B2 | 11/2007 | Massieu | |
| 7,315,241 B1 | 1/2008 | Daily et al. | |
| 7,344,273 B2 * | 3/2008 | Lewis et al. | 362/233 |
| 7,387,246 B2 | 6/2008 | Palestini et al. | |
| 7,392,951 B2 | 7/2008 | Ray et al. | |
| 7,395,970 B2 | 7/2008 | Poloniewicz et al. | |
| 7,454,841 B2 | 11/2008 | Burns et al. | |
| 7,549,582 B1 | 6/2009 | Nunnink | |
| 7,646,423 B2 * | 1/2010 | Yoshida et al. | 348/370 |
| 7,679,671 B2 * | 3/2010 | Tanaka et al. | 348/370 |

(56) References Cited

U.S. PATENT DOCUMENTS

| | | | |
|---|---|---|---|
| 7,686,223 B2 | 3/2010 | Vinogradov et al. | |
| 7,728,905 B2 * | 6/2010 | Tanaka et al. | 348/370 |
| 7,813,047 B2 | 10/2010 | Wang et al. | |
| 7,821,569 B2 * | 10/2010 | Yang | 348/360 |
| 7,850,377 B2 | 12/2010 | Okamoto et al. | |
| 7,853,137 B2 | 12/2010 | Yang | |
| 7,900,839 B2 | 3/2011 | Kotlarsky et al. | |
| 7,942,329 B2 | 5/2011 | Pine | |
| 7,957,007 B2 | 6/2011 | Dietz et al. | |
| 7,994,452 B2 | 8/2011 | Sawabe et al. | |
| 8,107,808 B2 * | 1/2012 | Messina et al. | 396/199 |
| 8,134,116 B2 | 3/2012 | Nunnink et al. | |
| 8,240,887 B2 * | 8/2012 | Daily et al. | 362/311.02 |
| 8,284,305 B2 * | 10/2012 | Newcomb et al. | 348/373 |
| 8,731,389 B2 | 5/2014 | Gainer | |
| 8,947,590 B2 | 2/2015 | Nunnink | |
| 9,823,552 B2 | 11/2017 | Kungl | |
| 2002/0014532 A1 | 2/2002 | Yomogida et al. | |
| 2002/0034320 A1 | 3/2002 | Mann | |
| 2002/0039099 A1 | 4/2002 | Harper | |
| 2002/0074403 A1 | 6/2002 | Krichever et al. | |
| 2002/0114505 A1 * | 8/2002 | Mahon et al. | 382/145 |
| 2002/0130963 A1 | 9/2002 | Gelbard | |
| 2002/0171745 A1 | 11/2002 | Ehrhart | |
| 2002/0191309 A1 | 12/2002 | Taylor et al. | |
| 2003/0019934 A1 | 1/2003 | Hunter et al. | |
| 2003/0020491 A1 | 1/2003 | Perenkemper et al. | |
| 2003/0062413 A1 | 4/2003 | Gardiner et al. | |
| 2003/0201327 A1 | 10/2003 | Jam et al. | |
| 2003/0205620 A1 | 11/2003 | Byun et al. | |
| 2003/0226895 A1 | 12/2003 | Havens et al. | |
| 2004/0020990 A1 | 2/2004 | Havens et al. | |
| 2004/0060032 A1 * | 3/2004 | McCubbrey | G06F 17/5054 716/104 |
| 2004/0092138 A1 * | 5/2004 | Smith | 439/74 |
| 2004/0159703 A1 | 8/2004 | Kogan et al. | |
| 2004/0238637 A1 | 12/2004 | Russell et al. | |
| 2005/0030744 A1 * | 2/2005 | Ducharme et al. | 362/231 |
| 2005/0035204 A1 | 2/2005 | Knappert et al. | |
| 2005/0045725 A1 | 3/2005 | Gurevich et al. | |
| 2005/0103851 A1 | 5/2005 | Zhu et al. | |
| 2005/0103854 A1 | 5/2005 | Zhu et al. | |
| 2005/0103857 A1 | 5/2005 | Zhu et al. | |
| 2005/0103858 A1 | 5/2005 | Zhu et al. | |
| 2005/0133601 A1 | 6/2005 | Yomogida et al. | |
| 2005/0167504 A1 | 8/2005 | Mier et al. | |
| 2005/0180037 A1 | 8/2005 | Masterson | |
| 2005/0199725 A1 | 9/2005 | Caraen et al. | |
| 2005/0212951 A1 | 9/2005 | Miyata et al. | |
| 2005/0275725 A1 * | 12/2005 | Olsson | G03B 37/005 348/207.99 |
| 2006/0008267 A1 | 1/2006 | Kim | |
| 2006/0027659 A1 * | 2/2006 | Patel et al. | 235/454 |
| 2006/0034596 A1 | 2/2006 | Yamazaki et al. | |
| 2006/0043187 A1 | 3/2006 | He et al. | |
| 2006/0043191 A1 | 3/2006 | Patel et al. | |
| 2006/0055819 A1 | 3/2006 | Pokrovsky et al. | |
| 2006/0060653 A1 | 3/2006 | Wittenberg et al. | |
| 2006/0081712 A1 | 4/2006 | Rudeen et al. | |
| 2006/0103755 A1 * | 5/2006 | Costigan et al. | 348/360 |
| 2006/0181862 A1 * | 8/2006 | Pohlert et al. | 362/3 |
| 2006/0213994 A1 | 9/2006 | Faiz et al. | |
| 2006/0251408 A1 * | 11/2006 | Konno | A61B 5/4547 396/14 |
| 2006/0279713 A1 | 12/2006 | Wang | |
| 2007/0040034 A1 * | 2/2007 | Hennick et al. | 235/462.41 |
| 2007/0047947 A1 * | 3/2007 | Huang et al. | 396/199 |
| 2007/0057067 A1 | 3/2007 | He | |
| 2007/0131770 A1 | 6/2007 | Nunnink | |
| 2007/0153512 A1 * | 7/2007 | Hendrie | 362/231 |
| 2007/0164115 A1 | 7/2007 | Joseph et al. | |
| 2007/0170259 A1 * | 7/2007 | Nunnink | G06K 7/10811 235/462.21 |
| 2007/0241195 A1 | 10/2007 | Hussey et al. | |
| 2007/0247422 A1 | 10/2007 | Holman et al. | |
| 2008/0093530 A1 * | 4/2008 | Hoelen et al. | 250/201.1 |
| 2008/0121168 A1 | 5/2008 | Ryznar et al. | |
| 2008/0158678 A1 | 7/2008 | Costigan et al. | |
| 2008/0277480 A1 | 11/2008 | Thuries et al. | |
| 2009/0057413 A1 | 3/2009 | Vinogradov | |
| 2009/0135287 A1 * | 5/2009 | Yang | G02B 7/02 348/335 |
| 2009/0159684 A1 | 6/2009 | Barber et al. | |
| 2009/0166424 A1 | 7/2009 | Gerst et al. | |
| 2009/0200380 A1 | 8/2009 | Longacre et al. | |
| 2010/0013922 A1 * | 1/2010 | Cheng | 348/143 |
| 2010/0165188 A1 | 7/2010 | Jannard | |
| 2010/0176319 A1 * | 7/2010 | Nunnink et al. | 250/566 |
| 2010/0177319 A1 | 7/2010 | Towers et al. | |
| 2010/0284184 A1 * | 11/2010 | Yang | 362/235 |
| 2011/0019106 A1 | 1/2011 | Huebner | |
| 2011/0019914 A1 | 1/2011 | Bimber et al. | |
| 2011/0019162 A1 | 7/2011 | Hueber | |
| 2011/0249966 A1 | 10/2011 | Weber et al. | |
| 2012/0039593 A1 * | 2/2012 | Yang | 396/175 |
| 2012/0092549 A1 * | 4/2012 | Hsu et al. | 348/374 |
| 2012/0092848 A1 * | 4/2012 | Kuczynski et al. | 362/3 |
| 2013/0222572 A1 * | 8/2013 | Sasaki | G03B 15/00 348/82 |

FOREIGN PATENT DOCUMENTS

| | | |
|---|---|---|
| EP | 00745951 | 12/1996 |
| EP | 00755018 | 1/1997 |
| EP | 0840107 | 6/1998 |
| EP | 00957448 | 11/1999 |
| EP | 00574024 | 9/2001 |
| EP | 01308875 | 5/2003 |
| EP | 01519298 | 3/2005 |
| EP | 1560150 | 11/2008 |
| GB | 2444399 A | 6/2008 |
| GB | 2444399 B * | 12/2011 |
| JP | 09-128471 A | 12/1997 |
| JP | 10134133 | 5/1998 |
| JP | 09128471 | 5/2006 |
| TW | M350188 U | 2/2009 |
| WO | WO-96003708 | 2/1996 |
| WO | WO-98016896 | 4/1998 |
| WO | WO-00016241 | 3/2000 |
| WO | WO-03062956 | 7/2003 |
| WO | WO-03063064 | 7/2003 |
| WO | WO-05041111 | 5/2005 |
| WO | WO-05050390 | 6/2005 |
| WO | WO-05073895 | 8/2005 |
| WO | WO-06/004858 | 1/2006 |
| WO | WO-06/026239 | 3/2006 |
| WO | 2008076399 | 6/2008 |
| WO | WO-10036403 | 4/2010 |

OTHER PUBLICATIONS

Gainer, "U.S. Appl. No. 13/302,922, Auto-Focus Mechanism for Vision System Camera", Nov. 22, 2011.

Cognex Corporation, "Cognex Expands Reading Capability", Natick, MA, (Oct. 9, 2007).

*Cognex Corporation, DataMan 100 SHD/C-Mount Kit Removal Instructions*, 590-7042, 2007.

* cited by examiner

CAMERA SYSTEM WITH EXCHANGEABLE ILLUMINATION ASSEMBLY

FIELD OF THE INVENTION

This invention relates to vision system cameras and more particularly to illumination systems for vision system cameras.

BACKGROUND OF THE INVENTION

Vision system that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code.

It is increasingly desirable to provide vision systems and associated vision system components that can be used for a variety of purposes. By way of example, an integrated sensor and single instruction, multiple data (SIMD) processor, which can be termed a vision system on a chip (VSoC), is shown and described in U.S. patent application Ser. No. 12/184,187, entitled VISION SENSORS, SYSTEMS AND METHODS, by E. John McGarry, et al., the teachings of which are incorporated by reference as useful background information. This architecture provided a highly versatile and widely applicable vision system platform for a variety of vision system tasks. The ability to provide a versatile system reduces costs by eliminating the need to provide a number of purpose-built vision system arrangements for specific applications. It is therefore desirable to provide such versatile vision system platforms. Other currently available arrangements of sensors and processors (e.g. digital signal processors (DSPs) can also be employed to provide a relatively compact and robust vision system.

A significant component of many camera systems is the illumination assembly. To adequately acquire an image of an object's surface, it is desirable to illuminate it appropriately. Depending upon the features being imaged and the relative angle of the camera axis to the features, the type of illumination employed can vary. For example, some features (e.g. peened features) can be best imaged using low-angle illumination, while other features (e.g. printed, high-contrast features) are typically best imaged using direct, high-angle illumination. Likewise the wavelength of illumination can vary depending on the nature of the features—that is, some features are best illuminated in the visible range, while others may be enhanced using infrared (IR) or ultraviolet (UV) light. Likewise, for some applications it is desirable to employ polarized light and/or to filter the light entering the camera with a polarizer or other appropriate optical filter. Many camera systems include a ring illumination arrangement consisting of one or more rows of that encircle the camera lens. These illuminators are often fixed in place, constructed on a circuit board, and containing a predetermined number and arrangement of lighting elements, such as LEDs. The illuminator is provided to the system based upon its expected application and is not readily replaced after the system has been delivered. Moreover, the manufacturer may offer systems with a various choices of illuminators in order to provide needed inventory to satisfy a potential customer's needs. Some of these systems may remain in inventory for a long duration before they are sold (if they are sold at all) to a customer/user. This increases the manufacturer's costs and can result in a limited number of available illuminator choices. To meet a specific user's need, the manufacturer may need to produce a custom-designed illuminator that entails further costs and delays in delivering completed vision systems to the user.

Moreover, when a system is delivered with an illumination assembly that proves inadequate, or it is desirable to re-task the system to a different application, it may be challenging or impractical to exchange the attached illuminator with one more suited to the task.

It is therefore desirable to provide an illumination assembly for a vision system that is highly versatile and adaptable to a variety of different applications without the need to maintain a large inventory of completed vision systems. This illumination assembly should be capable of interoperating with a variety of camera lens systems and should allow for exchangeability while avoiding the need of costly changes to the underlying vision system's physical housing or package. Moreover, the illumination assembly should enable a variety of types (wavelengths) of light to be projected, at a variety of angles, and in a wide range of power output levels. In addition, the illumination assembly should allow for use of various filters, to condition the projected illumination and/or to optically filter light received by the camera from the illuminated scene.

SUMMARY OF THE INVENTION

This invention overcomes disadvantages of the prior art by providing a vision system with an exchangeable illumination assembly that allows for increased versatility in the type and configuration of illumination supplied to the system without altering the underlying optics, sensor or vision processor, and their associated housing. The vision system housing includes a front plate that optionally includes a plurality of mounting bases for accepting different types of lenses. An optional connector is provided on the front plate to accept an electrical connection for a liquid lens component. The front plate includes a connector that allows removable interconnection with the illustrative illumination assembly. The illumination assembly includes a cover that is light transmissive on at least the front face thereof. The cover encloses an illumination component that can include a plurality of lighting elements (illustratively, LEDs in discrete banks) that surround an aperture through which received light rays from the imaged scene pass through to the lens. The cover can include a window, aligned generally with the optical axis of the lens/optics. Window can be transparent or constructed and arranged to selectively filter received light. Where the window provides a non-transparent optical characteristic, it can block or allow passage of discrete ranges of light wavelengths, or block/allow passage of discrete directions of light, such as a polarizer. The window can also provide other light-conditioning effects, such as a holographic diffuser. The lighting elements/LEDs can also include light-conditioning components in the form of lenses, covers or an insert that resides between the lighting elements and the light-transmissive cover face. The insert can diffuse or otherwise filter transmitted light and can include a plurality of differing effects with respect to differing lighting elements on the overall illumination component. The illumination component can comprise a circuit board that is seated within a well formed by the cover. The rear face of the circuit board is spaced apart from the rear edge of the cover, which removably and sealingly engages the front plate. The space provides clearance for a lens component projecting forwardly of the face of the front plate. The rear of the circuit board also includes a connector that removably engages the connector on the front plate. In an embodiment, the front plate's illumination connector is a multi-pin socket and the illumination assembly connector is a plurality of pins aligned with receptacles of the socket and generally parallel to the lens axis when the illumination assembly engages the front plate. The illumination assembly includes a gasket at the rear edge, and is secured to the front plate by a plurality of fasteners that pass through bases on cover and into the front plate. In an embodiment, the lighting elements (e.g. LEDs) are arranged in at least four discrete banks that surround the aperture. Illustratively, the banks each comprise a line of LEDs and can be arranged with an inside bank and an outside bank on each of the four sides. A pair of aiming lighting elements (e.g. laser diodes or LEDs) can also be provided adjacent to the aperture. The arrangement of LEDs (or other lighting elements) is highly variable. Different LEDs can be operated at different times to achieve different illumination effects. For example, different banks of LEDs can transmit light in different visible or non-visible wavelengths. The configuration of LEDs/lighting elements on the board can be varied, and the user can be supplied with an illumination assembly that best suits its needs without need to change the vision system processor, sensor or housing. When a different illumination configuration is desired, the current illumination assembly can be readily removed and a different illumination assembly can be attached to the housing. Likewise, various illumination assemblies can be provided with windows having differing optical characteristics so that the light received at the lens provides a desired condition (e.g. filtered, polarized, etc.). The illumination includes circuitry that selectively operates the LEDs/lighting elements, based for example on control signals (e.g. discrete strobe signals to enable, disable and activate various banks of LEDs) provided by the vision system processor through the interconnection.

BRIEF DESCRIPTION OF THE DRAWINGS

The invention description below refers to the accompanying drawings, of which.

DETAILED DESCRIPTION

Figure 1:
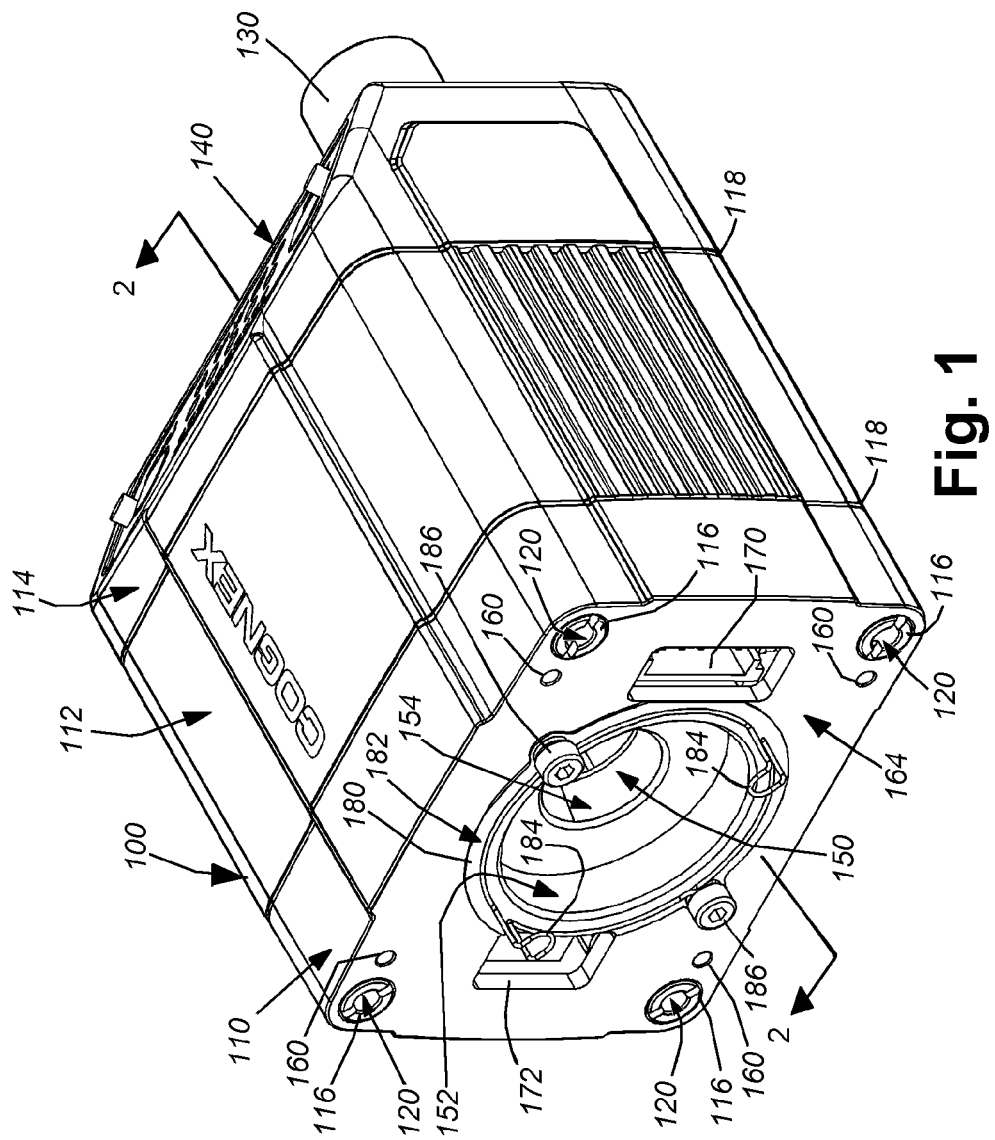
FIG. 1 is a perspective view of a vision system including a housing that allows for the removable attachment of a plurality of different lenses and illumination assembly configurations, according to an illustrative embodiment.
Figure 2:
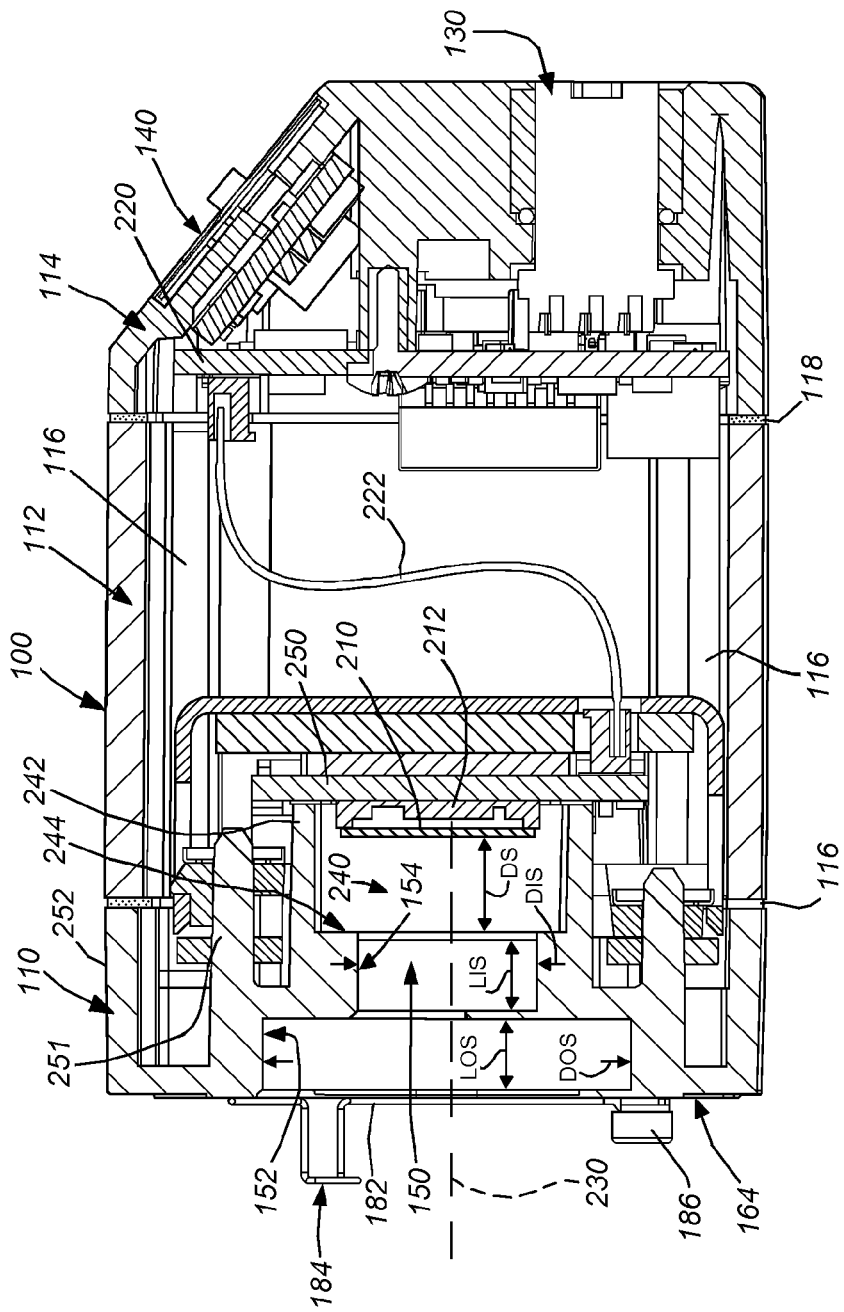
FIG. 2 is a side cross section of the housing taken along Line 2-2 of FIG. 1.

With reference to FIGS. 1 and 2, a vision system that includes an external package or "housing" 100 is shown in detail. The housing 100 can be constructed from polymer, metal, composite or a variety of materials in accordance with ordinary skill. In an embodiment, it consists of a front plate section 110, a main body section 112 and a rear section 114. The front plate section (or "front plate") 110 is joined to the main body and rear sections using four threaded bolts 116 that are seated within wells in the front plate 110, and that engage threaded holes in the rear section, thereby compressing the three sections together against gaskets 118 that seal the housing against infiltration of moisture and other environmental agents. The construction of the housing is highly variable in alternate embodiments. For example, the housing can be constructed with an integrated or unitary rear and main body or a unitary front plate and main body. Likewise, other fastening techniques can be employed, such as employing joining clamps or clips between sections.

In this embodiment, the bolts 116 are located adjacent to each of four corners of the somewhat rectangular-cross-section housing. The bolts 116 each illustratively contain respective threaded wells at their front end that allow for the attachment of accessories using threaded fasteners, or the attachment of the housing itself to a mounting surface.

The interior of the housing 100 supports an image sensor 212 (FIG. 2) that is arranged to acquire each image frame as an array of individual image pixels. In an embodiment, the sensor array is a CMOS sensor 212 (also termed an "imager"), which acquires image data in the form of pixel data. A cover glass 210 id provided to protect the sensor array 212. The sensor 212 is mounted on a printed circuit board 250 secured as depicted near the front end of the housing. The sensor circuit board 250 also illustratively includes processing circuitry (e.g. a digital signal processor DSP) that receives the pixel data from the sensor array 212 and performs various vision system processes on the data in accordance with non-transitory computer-readable program instructions and/or firmware instructions. The sensor circuit board 250 is interconnected with various power, control and other associated circuit components located on a circuit board 220 in the rear 114 of the housing. The two board assemblies 220, 250 are illustratively interconnected by a multi-lead cable 222 in this embodiment. Other arrangements of circuitry and interconnections are expressly contemplated. For example, in another embodiment, a VSoC arrangement (described above) can be provided to perform image acquisition and processing. The rear section 114 (and/or other sections 110, 112 of the housing) can be constructed from aluminum so as to act as a heat sink that assists in dissipating heat generated within the housing by the circuitry (described further below).

An external connector (or a plurality of connectors) 130 are located at the rear side of the housing 100 for providing power, data and/or other interface functions. The connector(s) is/are operatively connected to the circuit board 220. The rear also includes an external status and control panel 140 that provides the user with status indicators and feedback on vision system operations (for example, indicating whether a symbol has been properly identified and decoded). Appropriate on/off switches and other interface buttons can also be provided at this location, or at another appropriate location on the housing 100.

The plane of the sensor 212 is oriented perpendicularly to the longitudinal axis (i.e. camera axis) 230 of the housing 100. It resides within a space 240 that is open to an aperture 150 within a central region of the front plate 110. The space 240 is bounded by an enclosing wall 242 (having a relatively planar sides that can define a rectangular cross-section tube) that provides clearance for the sensor 212. The wall 242 extends from a step face 244 to the surface of the sensor circuit board 250. The distance DS from the step face 244 to the plane of the sensor 212 is approximately 6 millimeters. The aperture 150 is defined by an outer step 152 and a narrower inner step 154. Each step is threaded as described below. In particular, the outer step 152 defines a diameter DOS of approximately 25.4 millimeters (1 inch) and a depth (along the axial direction) LOS of approximately 5 millimeters. Likewise, the inner step 154 defines a diameter DIS of approximately 12 mm. The outer step 152 is female-threaded to a pitch of 32 threads per inch (TPI) and the inner step 154 is female-threaded to a pitch of 0.5 mm. In general, the positioning of the steps and size of the space are constructed and arranged to accommodate the focal length of each lens type being employed herein.

In an embodiment, the front plate assembly 110 is constructed from metal (e.g. die cast aluminum alloy), which is finished using an appropriate machining process. The casting includes the depicted recesses 152, 154 and other supporting structures (i.e. walls 242, 251 and 252) for lenses and other internal components. Notably, the supporting walls 242 (etc.), which contact and/or surround the sensor circuit board 250 assist in directing heat away from the board 250 and its associated circuit components and into the housing structure, where the heat is dissipated into the surrounding ambient air. In alternate embodiments the layout and configuration of the supporting structures can vary. In general, the thickness of walls used in such supporting structures is selected to provide sufficient structural strength with respect to the material employed in constructing the front plate 110. The front plate assembly 110 includes, along its front face 164, a plurality of threaded holes 160 that can be female-threaded to any appropriate size, so as accept corresponding threaded screws (described below). These screws can be used to attach a plurality of fittings and accessories to the front plate.

Note that directional terms such as "front", "rear", "up", "down", "top" "bottom", "right", and "left", as well as their variants and synonyms, should be taken as relative conventions only, and not as absolute indications of orientation of a structure relative to the direction of prevailing gravitational force.

With reference particularly to FIG. 1, the face 164 of the front plate assembly 110 includes a pair of connection sockets 170 and 172 respectively oriented to the right and left of the aperture 150 (as viewed from the front). Both sockets include respective connectors, which are interconnected with the system's processor circuitry (i.e. 250 and 220). The right socket 170 is employed to operate the optics of a liquid lens (described further below). The left socket 172 is employed to interconnect and operate an illumination assembly that can be directly attached to the front plate via threaded holes 160 or can be separately mounted. The illumination assembly is described in further detail below.

The perimeter 180 of the aperture 150 includes a circumferential spring assembly 182 with a pair of diametrically opposed, radially inwardly directed retaining shoulders 184. The spring assembly 182 is removably secured to the front face 164 by opposed screws 186 (M2 thread in this embodiment) that threadingly seat into holes (502 in FIG. 5). In an embodiment, the screws 186 are separated by a distance (on-center) of approximately 28 millimeters, taken through the camera axis (230). As described further below, the removable spring assembly is constructed and arranged to retain a liquid lens assembly.

It is contemplated that a user receives a housing 100 with a cap (not shown) to protect the aperture and sensor, and that the applicable lens and illumination assembly is purchased separately—to be attached by the user in a straightforward manner as described further below. Alternatively, the lens and/or illumination assembly can be provided to the housing by the manufacturer. In either case, there are a wide range of lens choices available.

Figure 3:
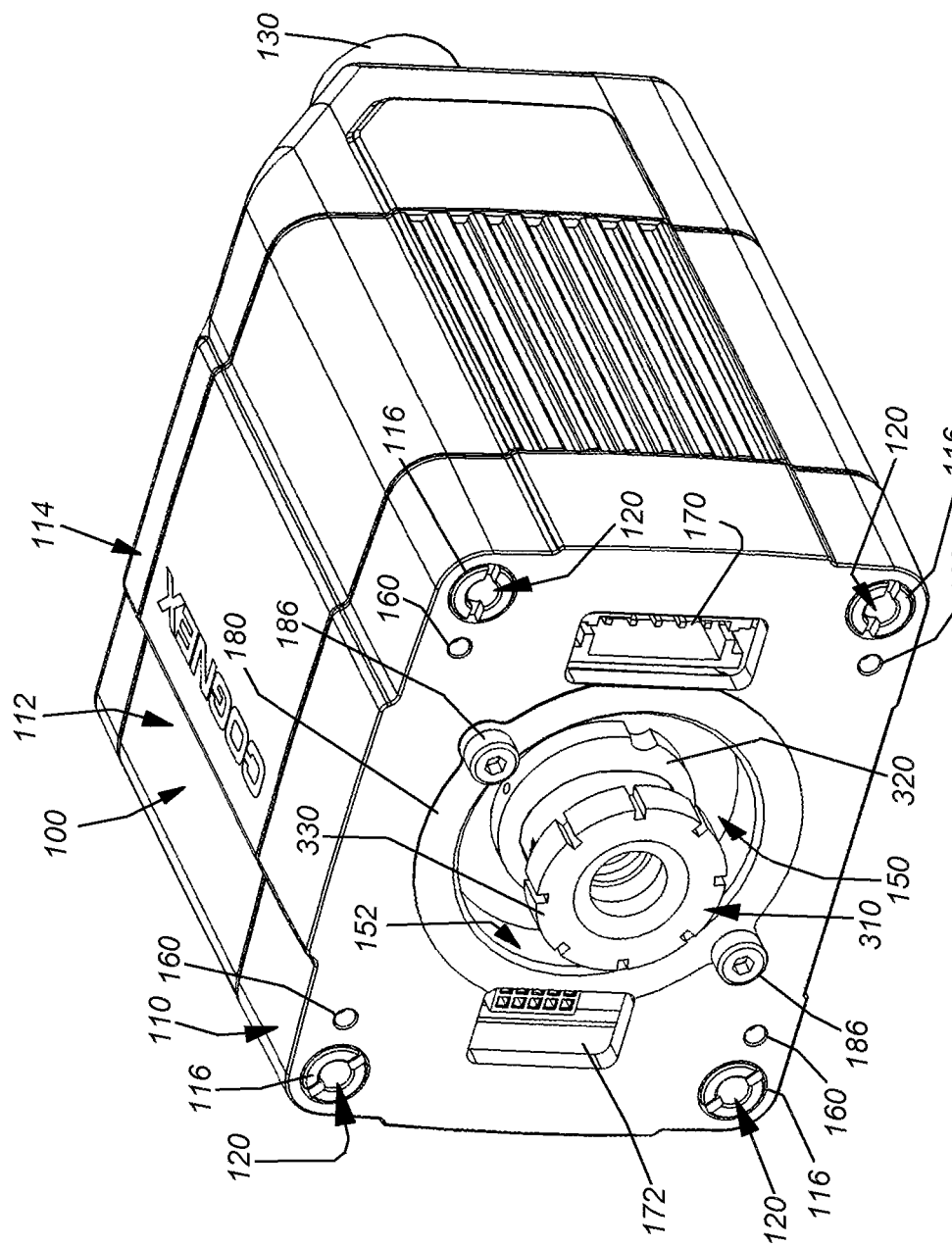
FIG. 3 is a perspective view of the vision system of FIG. 1 in which the housing includes an exemplary M12 type lens attached thereto, according to an illustrative embodiment.

Having described the generalized construction and function of the housing 100 and front plate assembly 110 according to an illustrative embodiment, the implementation of various types of lenses in conjunction with the housing is now described in further detail. With reference to FIG. 3, the housing 110 is provided with an attached M12 lens 310 according to an embodiment. By way of non-limiting example, the lens is a commercially available M12 lens with a conventional M12 threaded base. The male thread of the lens is secured into the female thread of the narrower, more-inset step 154, and is stopped from further inward threading, and generally locked in place using a counter nut 320, which is initially threaded onto the lens 310 base before attachment to the front plate assembly 110. The applied counter nut 320 can be adhered by the manufacturer (or another party) in place at an appropriate location along the lens using adhesive or another fixing technique. This ensures that, when the lens is tightened into place (e.g. by the user) to form a tight engagement with the front face 430 of the step 154 as shown, it is also positioned at a proper, predetermined distance with respect to the sensor's image plane. The lens 310 is thereby locked in place at a desired offset (to provide proper focal length) with respect to the plane of the sensor 212. Alternatively, where the user seeks to vary the mounting position of the lens, the counter nut can remain unfixed to the lens thread and counter-rotated by the user (or another party) to secure the lens in a desired position.

The front end of the lens can include a radially outwardly oriented ring 330 that engages the inner perimeter of an optional, frustoconically shaped stopper (not shown). The stopper protects the region of the aperture 150 between the lens front and the outer step 152, and avoids inadvertent loosening or readjustment of the tightened lens/counter ring 310/320 and protects against infiltration of dirt and moisture. The stopper can be constructed from an elastomeric material, and is removable press-fit into place against the C-mount female threads. In alternate embodiments, the stopper can employ a different securing system with respect to the housing front plate assembly 110, such as clips or mating threads.

It should be clear that attachment and detachment of the exemplary M12 lens 310 is relatively straightforward and entails the threaded rotation of only a few components with respect to the inner step 154 and (optionally) the outer step 152. Thus, the user or the manufacturer can desirably assemble an M12 lens vision system from a few readily available components. Likewise, if the user desires a C-mount-lens-based vision system, the housing can be assembled as shown in FIG. 5 (described below).

Figure 4:
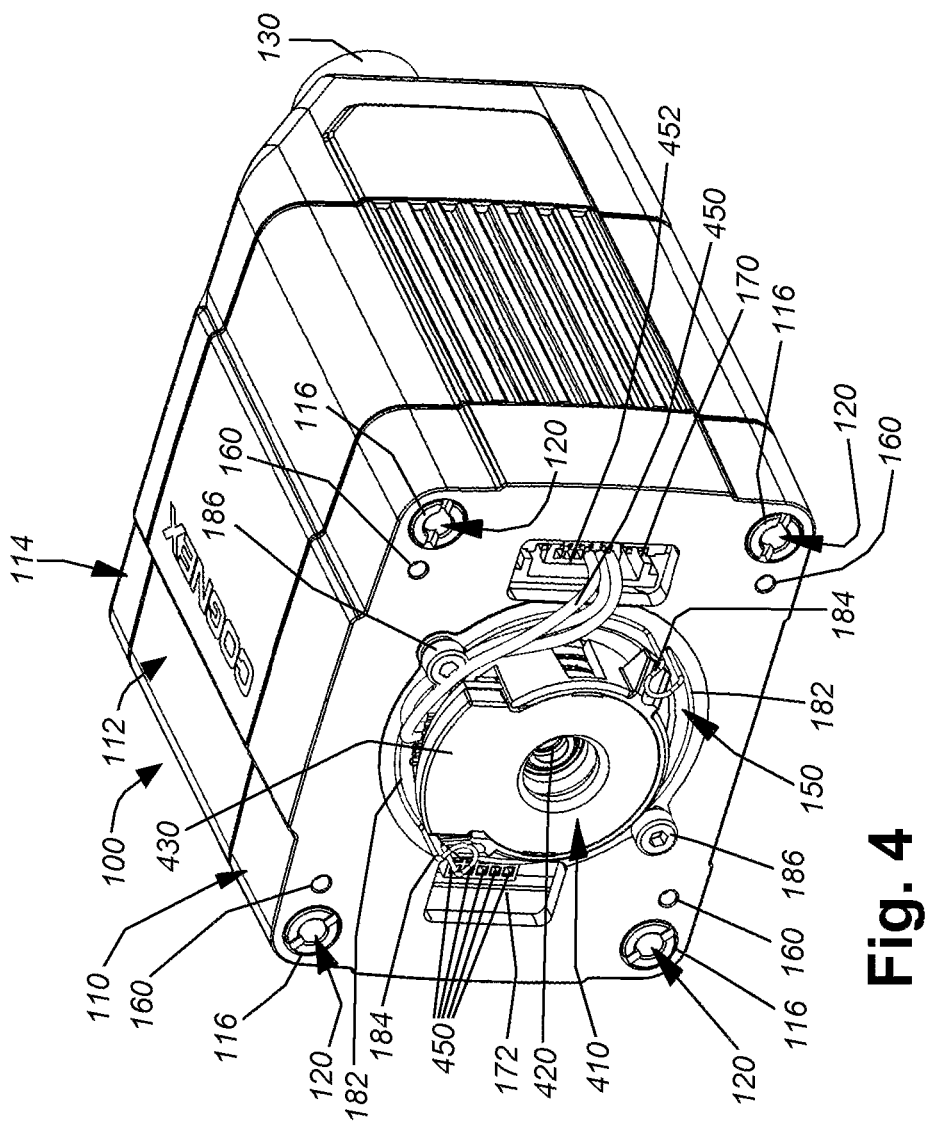
FIG. 4 is a perspective view of the vision system of FIG. 1 in which the housing includes an exemplary liquid type lens attached thereto, according to an illustrative embodiment.

According to the illustrative embodiment, the front plate assembly 110 is also constructed and arranged to mount a liquid lens assembly 410, as shown by way of example in FIG. 4. The exemplary liquid lens 810 can be based upon a commercially available liquid lens component 420 available from Varioptic SA of France. The liquid lens component 420 is mounted within an outer shell/housing 430 that is secured in place by the spring shoulders 184 described above. It is expressly contemplated that alternate hold-down arrangements for the liquid lens 410 can be employed. For example, the housing can include a C-mount base that engages the threads of the outer step 152. An advantage of the spring-retained lens arrangement is that it allows for the positioning of the connector cable 450 in a location that leads properly to the socket 170 (where the cable's connector 452 is shown connected in FIG. 4). Note that the socket and connector can be any acceptable multi-pin arrangement that provides a sufficient number of discrete lead connections to control the liquid lens assembly.

Figure 5:
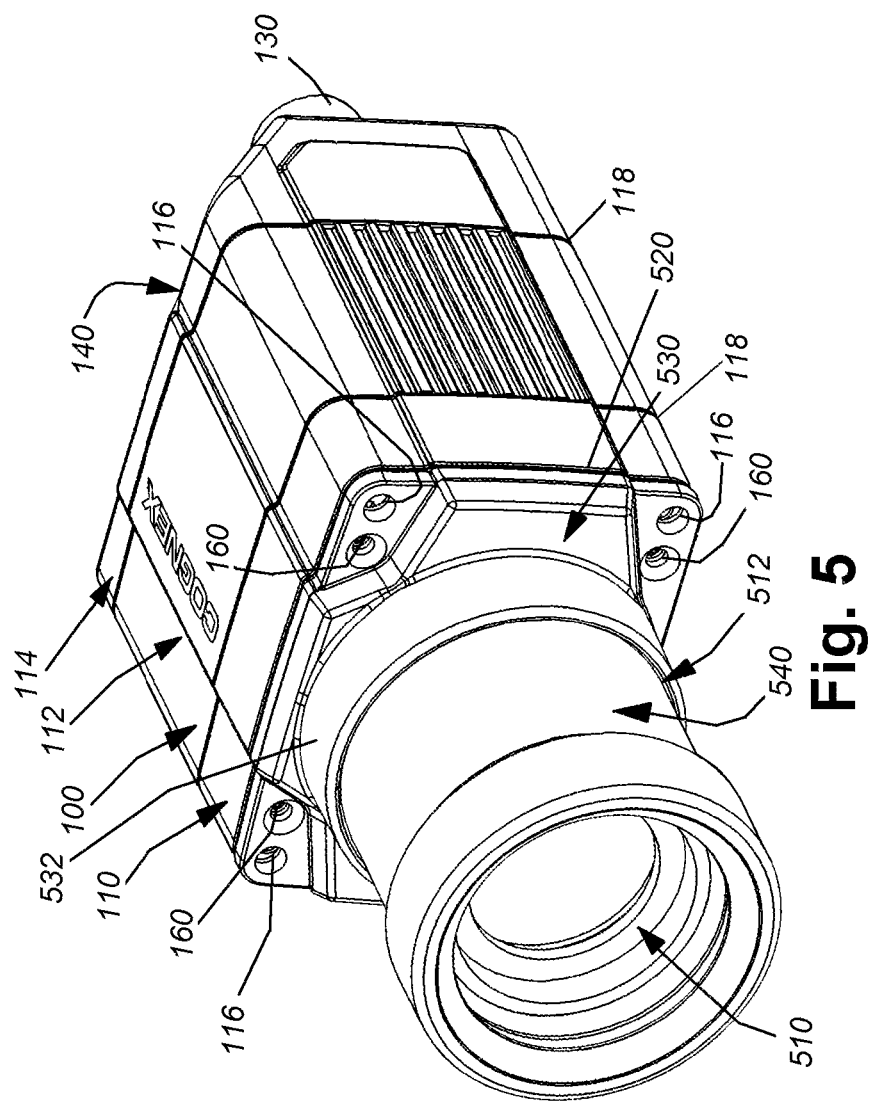
FIG. 5 is a perspective view of the vision system shown in FIG. 1 in which the housing includes an exemplary C-Mount type lens attached thereto, and in which the lens is covered by an optional shroud assembly, according to an illustrative embodiment.

In another example shown in FIG. 5, the male-threaded base of an exemplary C-mount lens 510 is threadingly attached to the female threads of the outer step 152 (see FIG. 1). The lens' base has been tightened so that its rear shoulder (not shown) engages the perimeter 180 of the aperture 150 (see also FIG. 1).

The C-Mount lens shown in FIG. 5 is optionally covered by a shroud (or cover) assembly 512 that primarily protects it from ingress of dirt/contaminants and moisture, and can also serve to protect against inadvertent change to the lens settings. The shroud assembly consists of a gasket plate 520 that covers the front face (164 in FIG. 1) and an overlying shroud base 530. The gasket plate 520 and shroud base 530 include through-holes that expose the central threaded holes (120 in FIG. 1) of each of the assembly bolts 116. This allows the system to be mounted as described above, or receive additional accessories on top of the shroud base 530. The gasket plate 520 and shroud base 530 thereby cover and seal the sockets (170, 172) in this configuration. In alternate embodiments, one or both of the sockets 170, 172 can be exposed through the gasket plate 520 and shroud base 530. The shroud base 530 and gasket plate 520 are secured to the front plate assembly 110 are compressibly secured by four screws (not shown) that thread into the screw holes 160 formed on the front plate assembly 110. In this embodiment, the shroud base 530 is countersunk in the region of each threaded hole 160 to receive a correspondingly shaped machine screw. Different screws or any other fastener arrangement that secures the shroud base 530 and (optionally) the gasket plate 520 can be employed in alternate embodiments can be employed in alternate embodiments. The front ring 532 of the shroud base 530 receives the shroud body 540, which overlies and covers the lens 510. The shroud body 540 can be constructed as a single piece, or from a plurality of pieces (e.g. a main body and nose as shown). It can be secured to the ring 532 by a threaded interconnection or another fastening arrangement.

Notably, the structure of the liquid lens arrangement and the use of a variety of directly-mounted lens assemblies are each described more fully in commonly assigned U.S. patent application Ser. No. 13/302,751, entitled VISION SYSTEM CAMERA WITH MOUNT FOR MULTIPLE LENS TYPES, by Laurens Nunnink, the teachings of which are incorporated herein by reference as useful background information.

Also notably, in the configuration of FIG. 5, the liquid lens connection socket 170 and illumination assembly connection socket 172 are each closed-off by the shroud assembly 512, and illumination of the imaged scene is provided separate from the housing. In alternate embodiments the illumination socket 172 can be exposed through the shroud assembly for interconnection with a cable and remote (or attached illuminator. In other examples described above, the system allows for use of an exchangeable, directly attached illumination assembly along the front face 164 of the housing 100 according to illustrative embodiments. These embodiments are now described in further detail.

Figure 6:
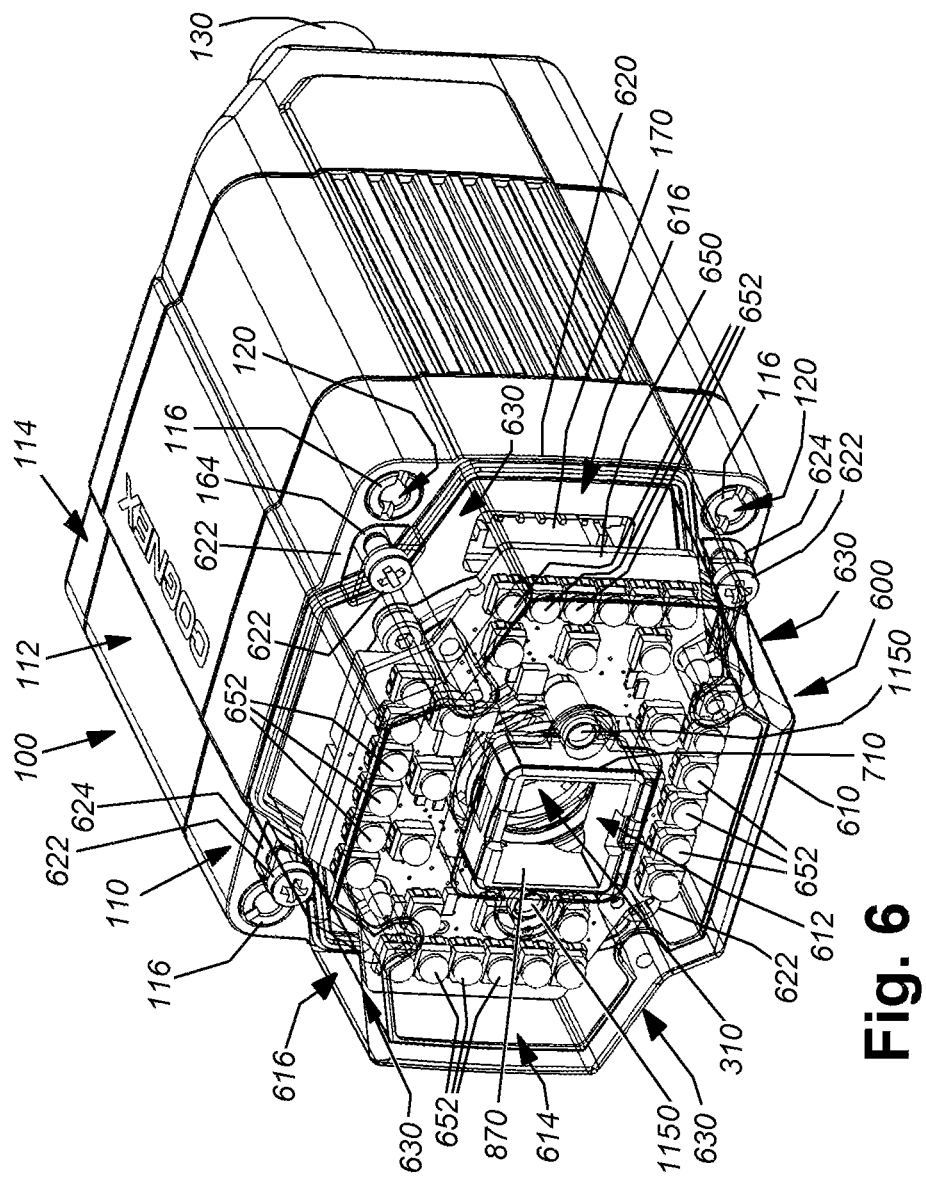
FIG. 6 is a perspective view of the vision system of FIG. 1 showing an embodiment of an exchangeable illumination assembly mounted to the front plate of the housing.

With reference to FIG. 6 the above-described housing 100 includes an exchangeable illumination assembly 600 attached to the front face (164) of the front plate assembly 110 according to an illustrative embodiment. The illumination assembly 600 includes a transparent or translucent cover 610. The cover can be constructed from any acceptable material, such as polycarbonate, acrylic or the like. It can be clear or colored and include a smooth or textured (e.g. frosted) surface along at least some of its interior or exterior surface. The cover 600 can be a constant thickness or can vary in thickness—for example a thickness of 2-7 millimeters. The central region of the cover 610 defines a slightly tapered recess 612 centered around the camera axis (230 in FIG. 2), and allowing for a field of view that enables unobscured or unoccluded imaging of a scene by the lens 310. As described below, the recess 612 leads rearwardly to a window 820 (see FIG. 8) that protects the lens and allows for application of various optical filters. Note that the above-described M12 lens 310 is used in this example. However, a variety of similarly sized and mounted lens types, as well as the above-described liquid lens can reside within the housing 100 in conjunction with the illustrative illumination assembly 600. In general, any lens that is sufficiently dimensioned to fit beneath the illustrative illumination assembly can be employed in the vision system according to an embodiment.

The cover 610 defines a front face 614 and a forwardly directed side wall structure 616. The side wall structure 616 joins the front face 164 of the housing's front plate assembly 110 at a gasketed joint 620. The gasket 620 maintains a seal that prevents environmental contamination of the system, as the cover is otherwise fully sealed as a unitary structure that is free of holes or perforations along its surface. The cover is secured to the front face 164 of the front plate assembly 110 by a plurality of screws (or other fasteners) 622 that pass through bases 624 that extend from the sidewall structure 616 at four (or another number) locations. The bases 622 and associated fasteners 620 are aligned with the holes 160 described above. In this embodiment, the sidewalls define a multi-sided, polygonal shape that includes indents 630 at the corners to provide clearance for the cover's bases 624 and the front plate assembly's bolts 116. In this manner, the bolts are open to allow attachment of the housing with attached illumination assembly 600) to a mounting system (via the threaded holes 120). In alternate embodiments, the cover 610 can be arranged so that the bolts 116 are covered, and attachment to a mounting system, if desired, is accomplished using a clamp or other appropriate attachment device.

Figure 7:
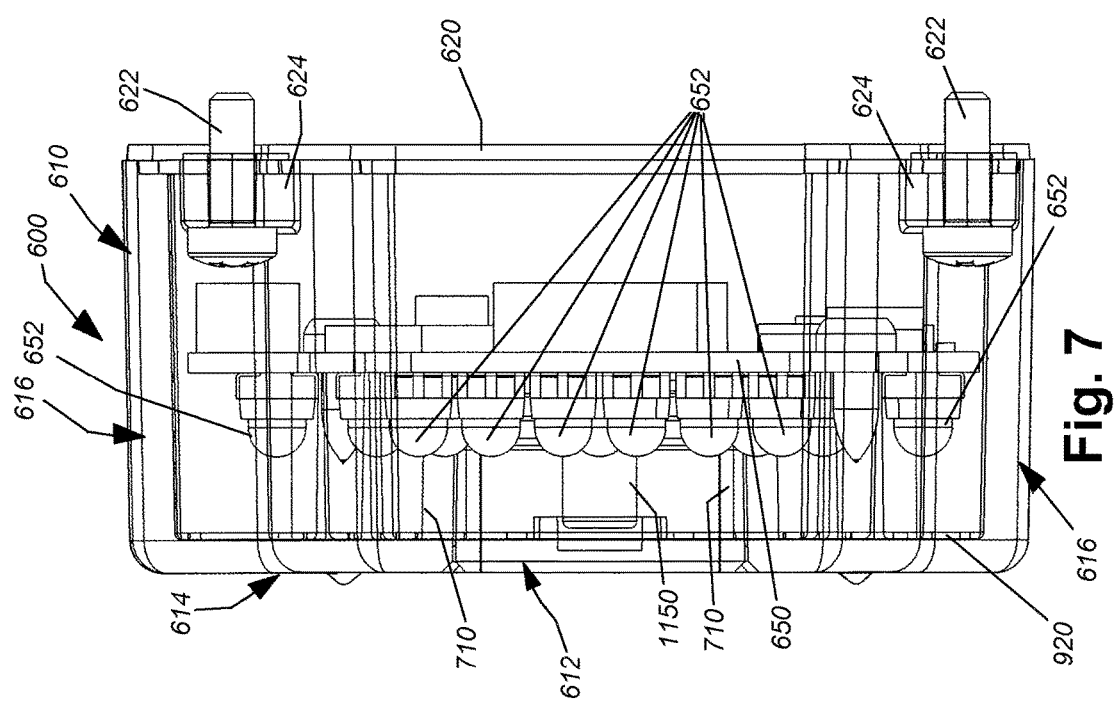
FIG. 7 is a side view of the illumination assembly of FIG. 6 shown detached from the housing.
Figure 8:
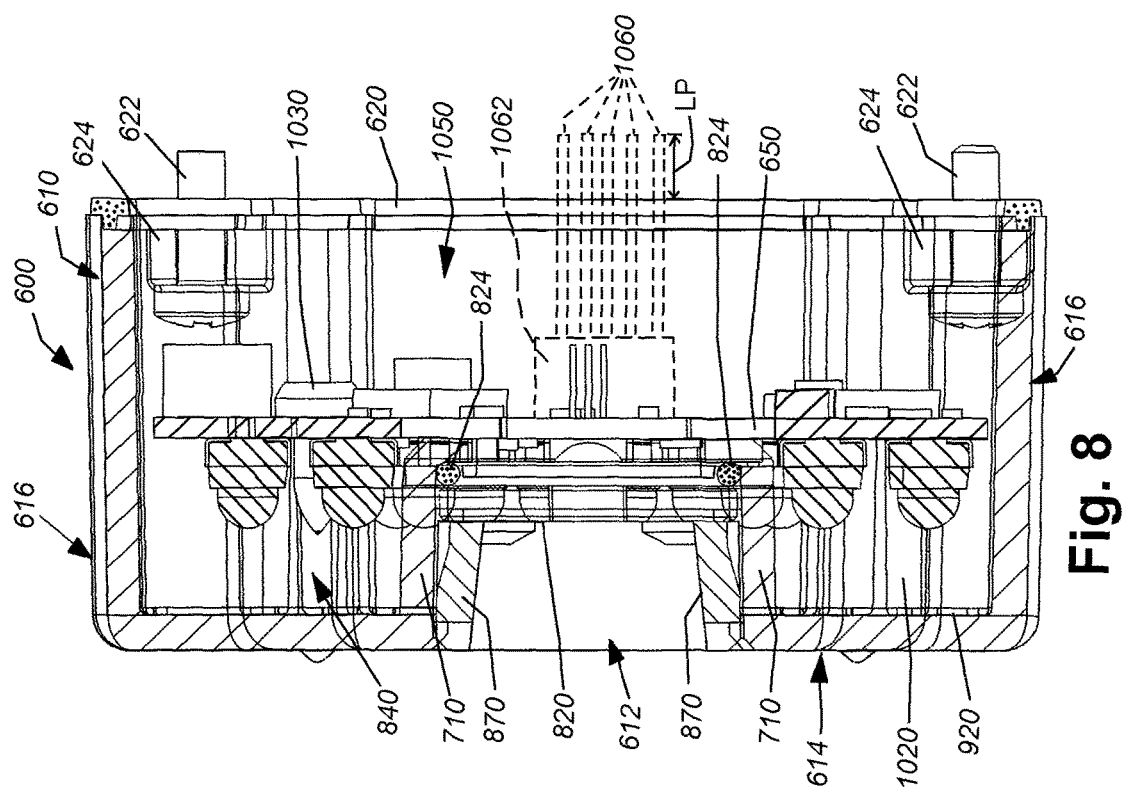
FIG. 8 is a side cross section of the illumination assembly of FIG. 6.
Figure 9:
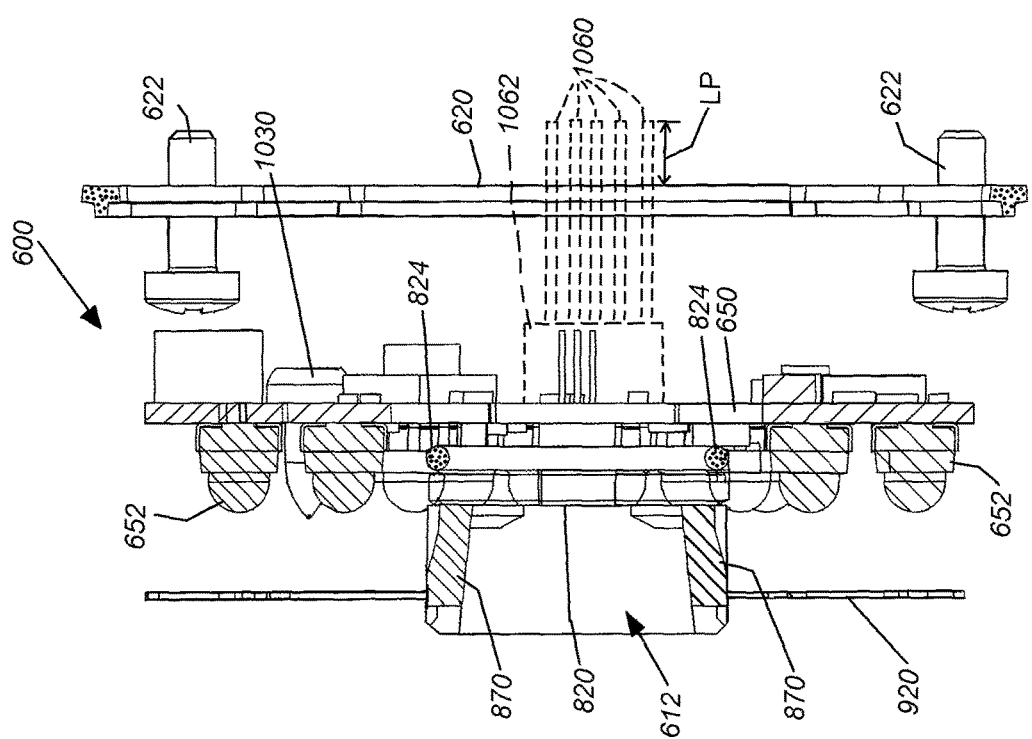
FIG. 9 is a side cross section of the illumination assembly of FIG. 6 with translucent cover omitted.

Further reference is made the FIGS. 7-9, which show the illumination assembly 600 detached from the housing 100. The circuit board 650 is shown contained within the cover 610, so that a plurality of illumination elements (e.g. high-output LEDs 652 in this embodiment) are directed forwardly to transmit visible light (and/or other wavelengths of light) light through the front face 614 of the cover 610 onto an imaged scene. FIG. 7 depicts a side view of the illumination assembly 600. FIGS. 8 and 9 depict a cross section of the illumination assembly 600 with the cover 610 respectively included and omitted (for further clarity). The cover includes a pocket defined by rearwardly directed walls 710, defining a generally rectangular box. The walls removably retain a snap-fit retainer having inwardly/rearwardly tapered walls 870 (see FIG. 8) that nest within the outer pocket walls 710. The tapered retainer walls 870 extend rearwardly to engage the front surface of a recessed window 820. This window allows passage of light received from the illuminated scene to the lens. Notably, the window can be constructed from a variety of materials (e.g. glass, polymer, such as polycarbonate or acrylic, and the like). The material can be transparent and/or transmissive to all light, or can include fillers and/or coatings (or coverings) that have (for example) an optical filtering or diffusive effect. In this manner the light received by the lens is conditioned in a desired manner to enhance certain properties of the acquired image. In various embodiments, the window 820 can be arranged to allow certain directions of light to pass in the manner of a polarizing filter or holographic diffuser. It can also selectively filter out, or allow passage of, discrete ranges of wavelengths, such as certain visible colors or non-visible UV or IR. Desirably, the window 820 is readily exchangeable either by the manufacturer or by the user to obtain desired filtering effects. The snap-in retainer and old window is removed, and then replaced with a new window to effect a change. The window can also (or alternately) include lensmatic shapes/geometries that provide distorting (or other) optical effects when desired. As described above, any filters or shapes can either be built unitarily into the window, or they can be mated to the window as a separate component.

The rear side of the window 820 engages an O-ring that seals the window with respect to the walls 710 of the pocket and prevents ingress contaminants and moisture from the outside environment. The circuit board 650 can be held in place with respect to the cover 610 by a variety of mechanisms, such as fasteners, clips or spacers that engage the front face of the housing and force the board 650 force it forwardly when the screws 622 are tightened into the holes 160 on the housing face 164.

As shown, the rear side of the circuit board 650 includes a variety of surface-mount components that drive the LEDs provided the front ace, and also control the operation of various LEDs in the overall array so as to drive selective LED elements or groups of elements at predetermined times based upon the control of the housing's processor. This control is described further below.

As shown in FIG. 9, the front face of the housing, surrounding the recess 612 includes a translucent insert 920 that can include a diffusive surface finish. For example, the insert can comprise a polyethylene or Mylar sheet with a frosted surface finish on one or both sides. This insert sheet 920 is optional, and helps to spread and diffuse the light transmitted from the discrete LED elements in illustrative embodiments. The sheet can be optionally colored or provided with various filtering characteristics to prevent/allow passage of certain wavelengths of visible and non-visible light. Alternatively, the insert can include a polarizer that provides a polarized illumination or another specialized lighting effect. The insert can provide a variety of effects that can optionally vary with respect to differing lighting elements or banks on the overall illumination component. For example, parts of the insert can be clear while others can include a color filter. The selection of a filtering/diffusive insert is one of a number of options enabled by the use of an exchangeable illumination assembly according to various embodiments.

Figure 10:
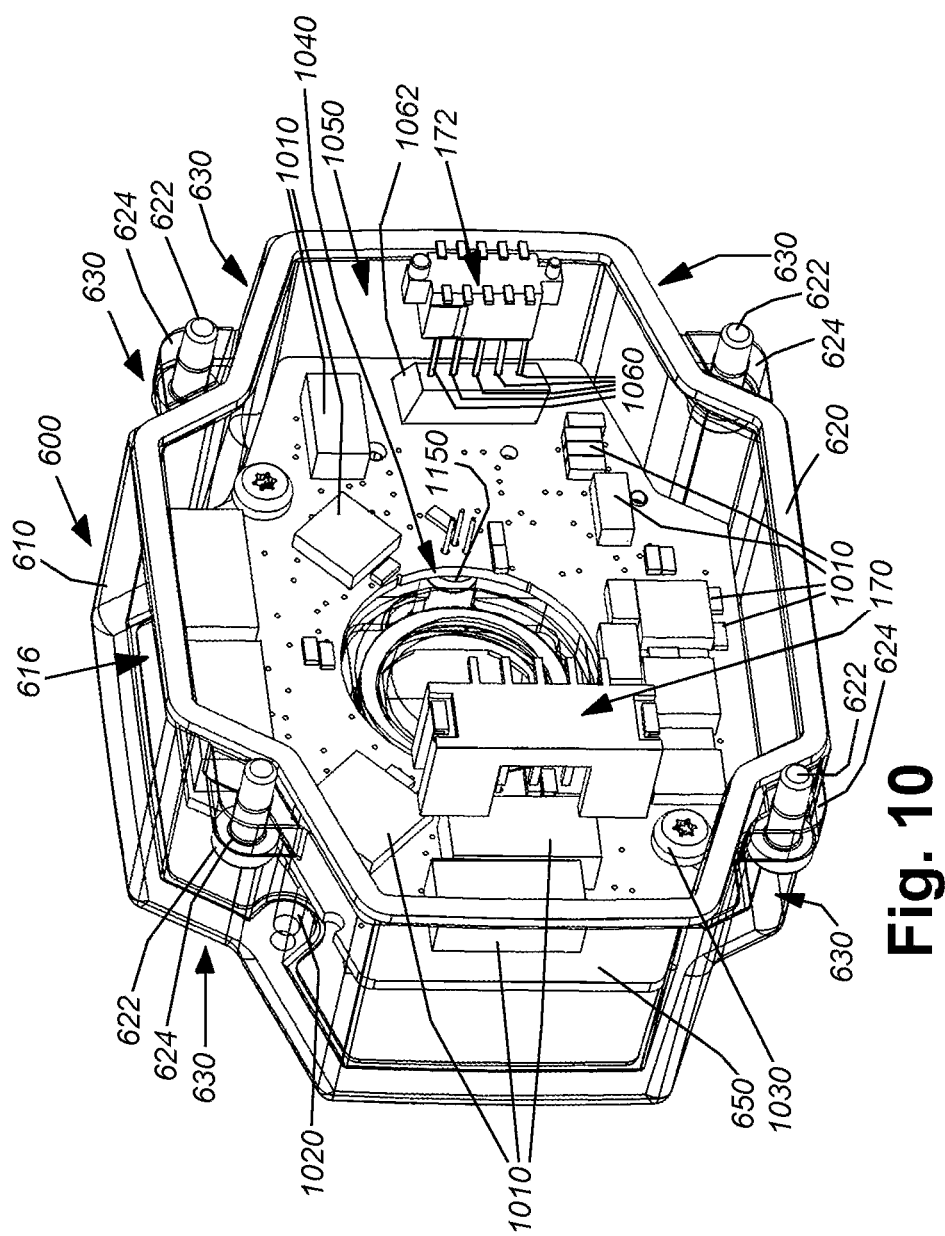
FIG. 10 is a rear perspective view of the illumination assembly of FIG. 6 showing the relative position of housing electrical connectors.

With reference also to the rear perspective view of FIG. 10, various drivers, control circuitry and processors 1010 are shown with respect to the rear side of the circuit board 650. The arrangement, connectivity and functions of these electronic components is highly variable and can be implemented in accordance with ordinary skill using conventional components and/or conventional programming techniques. As shown, the circuit board 650 is secured to the cover 610 by fasteners (self-tapping screws 1030) that seat in molded wells 840 (shown clearly in FIG. 8) formed on the inner surface of the cover 610. The wells 840 and associated fasteners 1030 are located at two positions that are adjacent to diagonally opposed corners (indents 630) of the cover 610. The number and positioning of fasteners is highly variable in alternate embodiments. A pair of spacer posts (that can also be arranged to receive fasteners) is located adjacent to the other two, diagonally opposed corners of the cover 610. The wells 840 and posts 1020 provide a standoff (i.e. a spacing) between the circuit board 650 and associated LEDs and the inner surface of the cover's front face 614. This spacing is highly variable. In an embodiment it is between approximately 1 and 4 cm. The spacing prevents the LEDs from directly contacting the cover surface and also allows the light rays projected from each LED to spread before they reach the diffuser 920. Note that, in addition to (or as an alternative to) the insert 920, one or more of the LEDs/lighting elements can include an overlying lens or cover that provides a desired illumination effect (e.g. polarization, wavelength-filtering, diffusing, etc.).

Also with reference to the rear perspective view of FIG. 10, the circuit board 650 is depicted as including an enlarged central, circular aperture 1040 that provides an unobstructed passage for light from the recessed window 820 to the lens assembly on the housing. The circuit traces (not shown) on the board 650 are constructed and arranged to interconnect the various circuit components and LEDs on the opposing faces of the board 650. Notably, the two housing connectors 170 and 172 have been included in the view of FIG. 10. As described above, the liquid lens control connector 170 is tied to the liquid lens element when attached. The space 1050 between the rear edge (gasket 620) and the circuit components 1010 on the rear of the circuit board 650 of sufficient in depth, height and width to accommodate the volume of the liquid lens assembly and/or M12 lens assembly, or any other lens assembly contemplated herein, which projects forwardly from the housing face 164. The opposing illumination assembly connector 172 defines a ten-pin socket in an illustrative embodiment. This socket includes associated female receptacles 450 (See FIG. 4). Five of these receptacles are constructed and arranged to removably receive one of five elongated male pins 1060 (also shown in phantom is FIGS. 8 and 9) that project rearwardly from a connector base 1062 on the rear of the circuit board 650. The pins 1060 variously provide power and control signals (e.g. digital control data) to the electronic components of the circuit board 650. In an illustrative embodiment, at least two pins provide power and the remaining pins provide data/control. The number of pins 1060 (and associated female socket receptacles) and their arrangement are highly variable. In alternate embodiments, less than five pins can be employed, with the used pins being aligned with associated receptacles on the socket. In other words, four pins can be connected to four of the five socket receptacles. Likewise, where additional connections are desired, more than five ppins can be employed, interconnecting with associated receptacles in the socket 172. In further alternate embodiments a different connector arrangement, such as a DIN connector, can be employed to removably interconnect the illumination assembly and housing.

The length LP (See FIG. 8) of the pins 1060 that projects rearwardly beyond the rear edge (gasket 620) of the cover 610 is highly variable. In general, the length LP can vary and is arranged to allow the pins to fully seat into respective socket receptacles when the illumination assembly is secured to the housing face 164 by screws 622. In alternate embodiments, the socket 172 can project outwardly (forwardly) from the housing face 164, and the pins (or other connectors) can be recessed within the space 1050 of the cover's rear enclosure area. Also, while the illumination assembly contains the male connector elements and the housing 100 contains the female connector elements, it is expressly contemplated that the male elements can be contained on the housing and the female elements can be contained on the illumination assembly, or each component can contain a combination of male and female elements. Likewise, some or all of the connections can be implemented as a gender-less connectors in an alternate embodiment.

Figure 11:
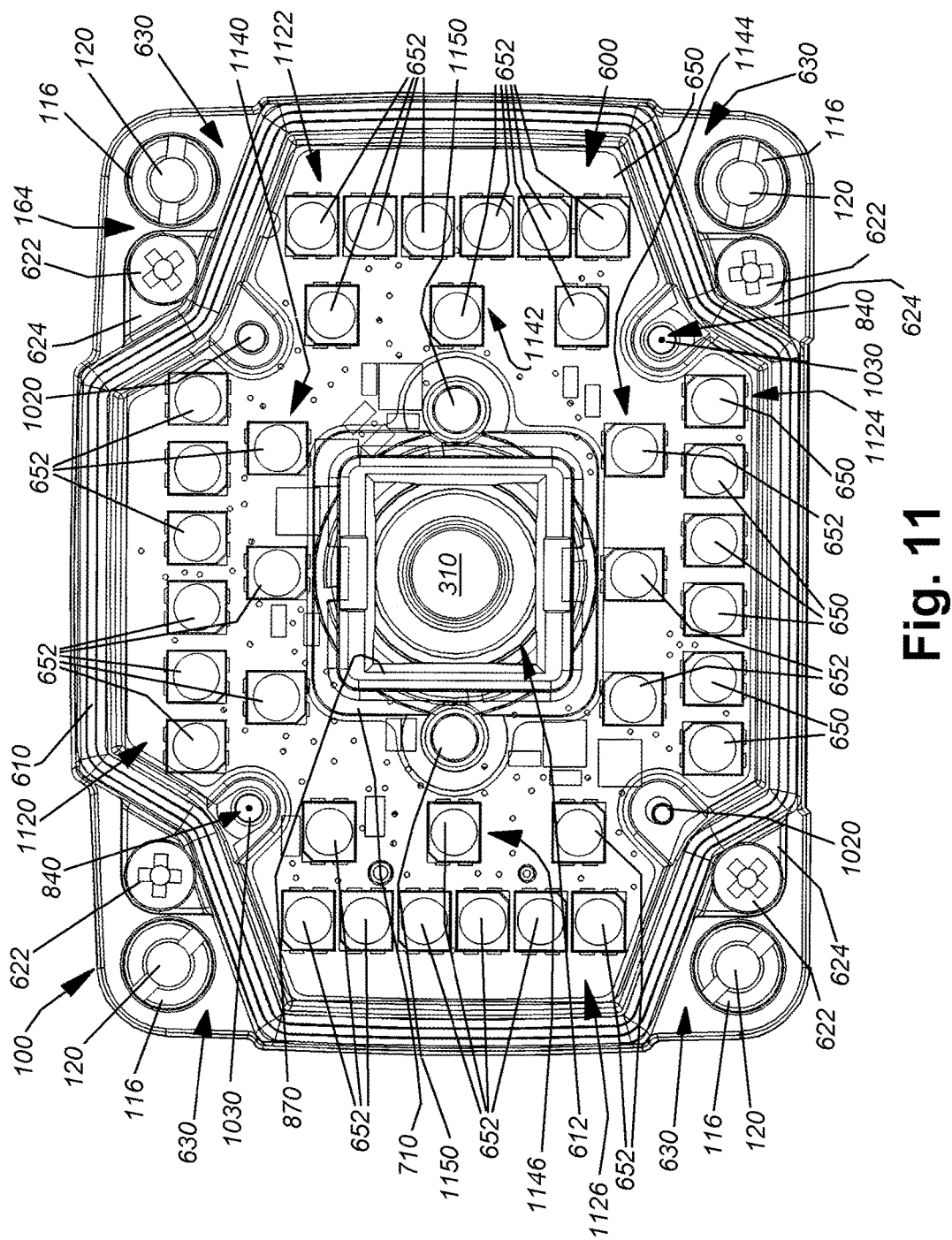
FIG. 11 is a front view of the vision system shown in FIG. 6 with the illumination assembly mounted on the housing.

Reference is now made to FIG. 11, which shows a front view of the housing with the illumination assembly 600 and associated cover 610 attached thereto. In this embodiment, the assembly 600 contains four outside lines or "banks" 1120, 1122, 1124 and 1126 of six LEDs 652 arranged, respectively at the top, right, bottom and left (i.e. North, East, South and West) quadrants of the assembly's front view. The number of LEDs in each bank is highly variable, and a larger or smaller number of LEDs can be provided to some or all of the banks Likewise, the number and positioning of banks on the circuit board is highly variable. While the LEDs of each bank 1120, 1122, 1124, 1126 are arranged in an approximate line, in alternate embodiments the banks of LED can be arranged in a non-linear orientation (e.g. an arcuate shape).

A second set of inside banks 1140, 1142, 1144 and 1146 of LEDs 652 are arranged adjacent to and inwardly from each of the outside banks 1120, 1122, 1124 and 1126, respectively. The LEDs in the inside banks are provided as a line of three spaced-apart elements. In alternate embodiments, the arrangement can be non-linear and more or fewer LEDs can be provided in each bank. Likewise, the number of inside banks and their placement on the board 650 is highly variable—for example, inside banks on the top and bottom or left and right can be omitted. The outside banks can contain LEDS having a certain discrete color or wavelength (e.g. visible, IR or UV that differs from that of the inside bank). Alternatively, the outside and inside banks can respectively contain similar LED types and the used alternately, or together, when more or less light intensity is desired. In other words, when a more intense illumination is desired, both sets of banks are used at once. In addition, the banks can be used in increments while an image is being acquired. That is the outside banks are illuminated first followed by the inside banks so that the image of the scene is acquired with two different forms of illumination. Illustratively, the processing components within the illumination assembly 600 receive data and control signals via the connection with the housing (pins 1061 and socket 722) that are provided by the vision system's (housing's) on-board processor and/or a remote processor connected thereto. The system processor includes program instructions that generate illumination commands for the assembly 600. Based upon the vision system program and/or feedback from the acquired image, the system processor can direct illumination of different banks of LEDs (or other lighting elements). This can be to provide differing angles of illumination to the imaged object surface (e.g. high or low-angle illumination), or to provide differing wavelengths or intensities. The illumination assembly's control circuitry illustratively receives discrete strobe signals that enable or disable selected banks and/or discrete LEDs in banks. In this manner, the system operates only banks that are enabled. This can also allow for a timed sequence of different illumination patterns that coincides with acquisition of one or more images under differing illumination effects. For example, the system can instruct that only the left and right outside banks are illuminated for T1 milliseconds, and then that all inside banks are illuminated for T2 milliseconds. During these illumination intervals (T1, T2) one or more images of the scene are thereby acquired by the system.

The illumination assembly also includes two aiming lighting elements that can illustratively comprise laser diodes. Alternatively, focused LEDs 1150 or another light source capable of a projecting an aiming point at the appropriate scanning distance can be used as aiming lighting elements. These aiming points provide a projected point in a discrete color (e.g. red) that assists the user in directing the lens axis toward the features to be acquired (e.g. a barcode) prior to actual image acquisition.

Notably, the degree to which the banks and/or discrete LEDs within banks are independently addressable by the vision system and illumination assembly's processing circuitry is highly variable. As described further below, the exchangeable illumination assembly 600 of this embodiment advantageously allows for different types of LEDS, arrangement of banks and addressing patterns for discrete LEDs in banks to be provided. The user obtains the illumination assembly that best suits its needs. More generally, the use of varying illumination patterns during image acquisition is described by way of example in commonly assigned, published US Patent Application Number US 2009-0121027 A1, entitled SYSTEM AND METHOD FOR READING PATTERNS USING MULTIPLE IMAGE FRAMES, by Sateesha Nadabar, the teachings of which are incorporated herein by reference as useful background information.

As described above, the illumination assembly advantageously allows the user to select an illumination configuration that is best suited to its needs without changing out the entire vision system. This also advantageously allows the manufacturer to retain stocks of various illumination assemblies (in differing configurations), which all interoperate with a single housing unit. This reduces inventory costs as housings can be sold without regard to their illumination configuration (or lack thereof). Where illumination is permanently attached to a housing, the manufacturer typically maintains a stock of several different types of units. Some of these units can reside on the shelf for years if they are not a popular configuration, but must be maintained in the event a particular customer desires that specific configuration. By providing a separate, exchangeable illumination assembly, expensive vision system housings can be sold without regard to illumination and the (relatively) lower cost illumination assemblies can be kept in inventory. Moreover, the use of an exchangeable illumination assembly according to the illustrative embodiment allows for easier customization of the illumination configuration without the need to customize the entire vision system. Such customization can entail the use of an LED (or other light component) arrangement that is specifically adapted to the user's needs. Alternatively, the manufacturer can stock a plurality of different assemblies, each having a differing, commonly used illumination configuration.

Figure 12:
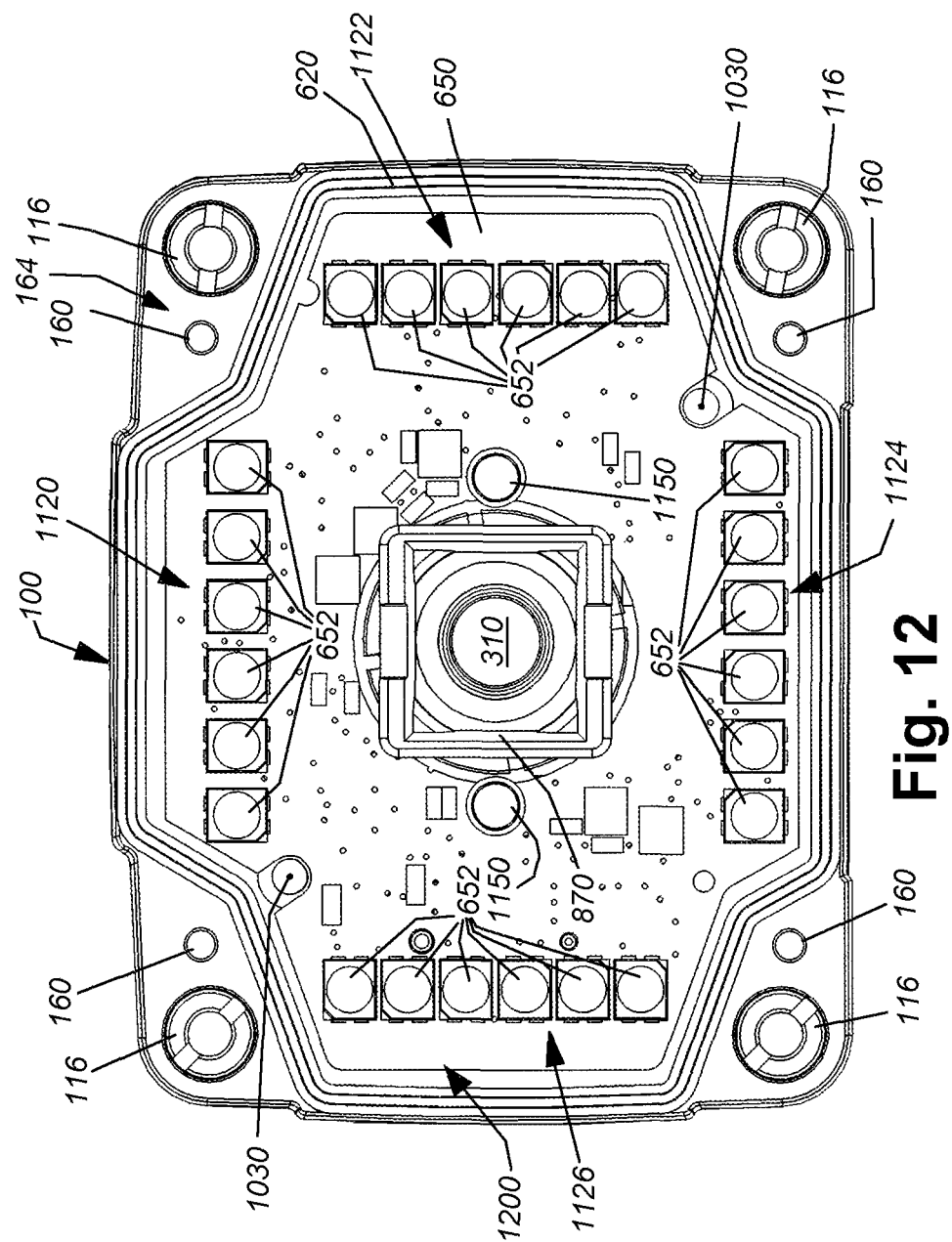
FIG. 12 is a front view of the vision system shown in FIG. 6 with the illumination assembly mounted on the housing and having a differing illumination configuration according to an exemplary embodiment.

For example, with reference to FIG. 12, the illumination assembly 1200 is based on the circuit board 650, cover 610 (omitted for clarity in this view) gasket 620, and other common components of the above-described illumination assembly (i.e. like reference numbers in this view refer to like components as those shown in FIG. 6). The assembly 1200 has been modified to omit the inside banks (1140, 1142, 1144, 1146) as the user does not require these banks to achieve its imaging goals. The exemplary assembly 1200 can potentially be less costly and less-complex for that user than the fully featured assembly 600 described above. The vision system processor and/or the processing circuitry of the assembly 1200 can be configured so that the omission of the inside banks is recognized and any functions that employ these banks are disabled. This configuration and recognition can be accomplished using conventional hardware and software techniques.

Figure 13:
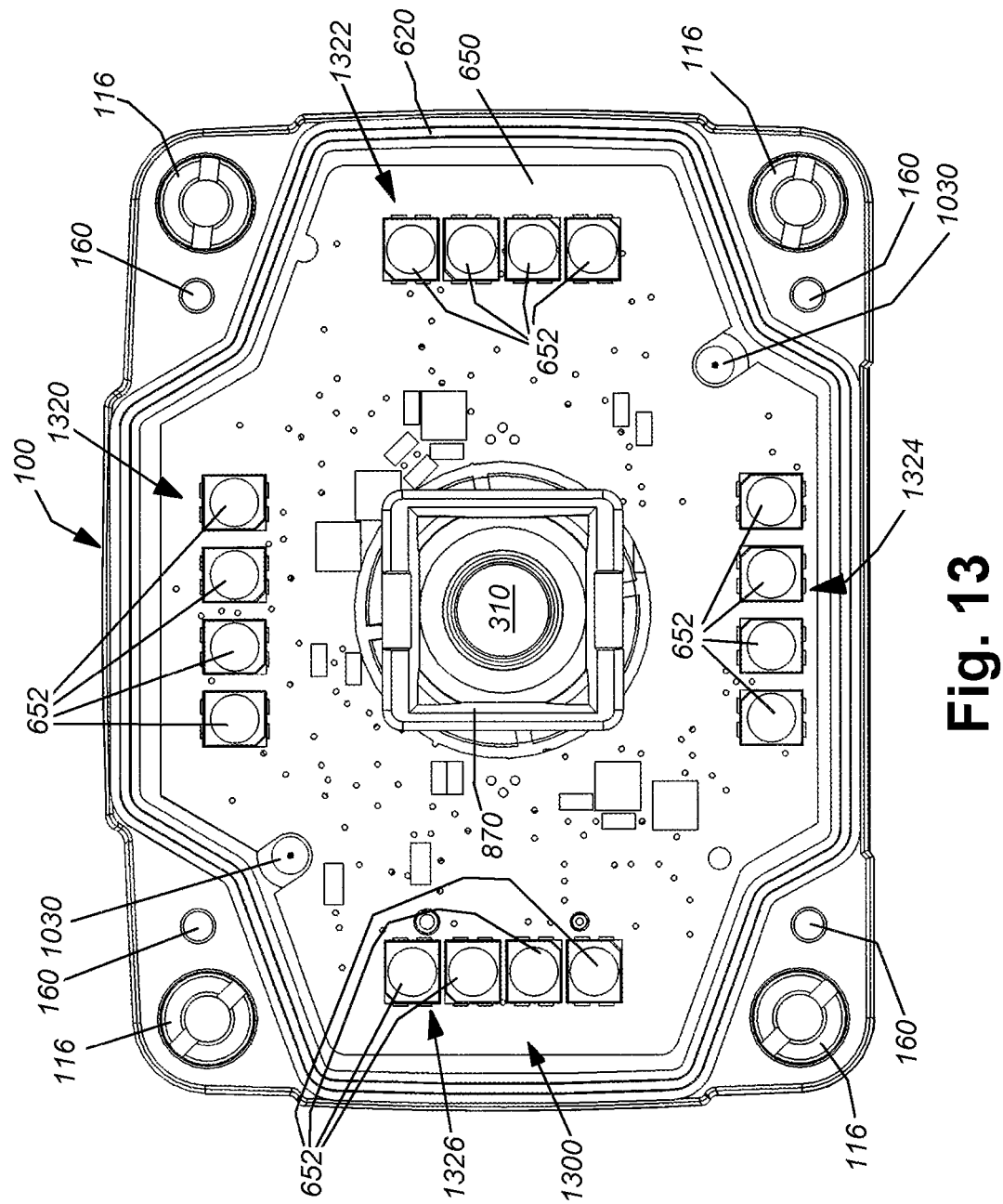
FIG. 13 is a front view of the vision system shown in FIG. 6 with the illumination assembly mounted on the housing and having another differing illumination configuration according to another exemplary embodiment.

A further example of an illumination assembly 1300 for use in the vision system of the illustrative embodiment is shown in FIG. 13. In this example, the inner banks 1140, 1142, 1144, 146 are omitted as well as the aiming LEDs 1150. The outside banks 1320, 1322, 1324 and 1326 have been modified with respect to the above-described example to omit the opposing end LEDs, thus creating four banks each having four LEDs 652. This configuration provides a reduced illumination intensity for certain applications relative to the above-described assemblies 600, 1200. In alternate examples, the LEDS in each bank m1336 can be spread apart.

The examples provided above are illustrative of a wide range of illumination configurations for the exchangeable illumination assembly contemplated herein. Advantageously, the vision system of the illustrative embodiment allows one housing to accommodate a large multiplicity of illumination assembly configurations. These configurations can include a wide range of variations in the placement of LEDs and the arrangement of banks. Likewise, the addressability of discrete LEDs (or other illumination elements) is widely variable based upon the structure (e.g. drivers and circuit traces) of the circuit board and the programming of the system processor and assembly's processing circuitry. Likewise, the illustrative housing allows such widely variable illumination assemblies to be removably mated to the housing that can mount a plurality of different lens types and/or optical properties. The resulting vision system is highly versatile while reducing both the manufacturer's and user's costs, and allowing for post-purchase upgrade and modification of lenses and illumination (e.g. to re-task the system to a different role) without the need to obtain an entirely new vision system.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while a solid, fixed connector arrangement is provided between the illumination assembly and the housing, it is expressly contemplated that a cable can interconnect the illumination assembly and housing. The cable can be removably connected to either (or both) the housing and the illumination assembly. In addition, while the illumination elements described herein are generally LEDs, it is expressly contemplated that other types of illumination can be substituted for, or used in addition to, the depicted LEDs. For example, gas discharge elements, incandescent bulbs, fluorescent bulbs, and the like can be used. Also, while the term circuit board is used to describe generally an illumination component within the overall illumination assembly, it is expressly contemplated that another structure can be employed to mount LEDs or other lighting elements (e.g. a socket structure), and that some or all of the driving and/or other processing circuitry can be located on this structure or at another location within the assembly. Moreover, it is contemplated that any of the electronic control, data and other functions provided herein can be performed using electronic hardware, software consisting of a non-transitory computer-readable medium of program instructions, or a combination of hardware and software. Some or all of the image processing components can be located remote from the housing enclosure, with the housing containing the above-described illumination assembly, optics and sensor, and being interconnected with processing components by appropriate physical (e.g. wired) or wireless links. Accordingly, this description is meant to be taken only by way of example, and not to otherwise limit the scope of this invention.

What is claimed is:

1. An exchangeable illumination assembly for a vision system having a housing that encloses optics and a sensor receiving light from the optics comprising:
   a cover having a light-transmissive face that defines a forward-facing exterior surface of the cover, the cover having therein an illumination component having a plurality of lighting elements, the cover including a window through which light passes into the optics and the lighting elements arranged to direct light through the light-transmissive face at locations around the window, wherein the illumination component is secured to the cover via at least one fastener, wherein the cover comprises a plurality of sidewalls, the sidewalls defining a multi-sided polygonal shape, the cover having a plurality of rearwardly directed walls defining a pocket, the pocket configured to receive a removable tapered wall assembly that nests within the plurality of rearwardly directed walls and that engages with the window, a rear side of the window engaging with a sealing member that seals the window with respect to the plurality of rearwardly directed walls;

a fastening assembly that removably secures at least two corners of the cover to the housing; and a connector assembly that removably interconnects processing circuitry that controls the lighting elements to the housing so that control signals and power from the housing are transmitted to the illumination assembly.

2. The exchangeable illumination assembly as set forth in claim 1 wherein the connector assembly includes a plurality of pins that extend rearwardly from the illumination component, and being constructed and arranged to removably seat with receptacles of a socket located on the housing.

3. The exchangeable illumination assembly as set forth in claim 1 wherein the lighting elements comprise LEDs arranged in banks at the locations around the window.

4. The exchangeable illumination assembly as set forth in claim 3 wherein the illumination component includes processing circuitry constructed and arranged to operate at least some of the LEDs at selected times to generate a desired illumination effect.

5. The exchangeable illumination assembly as set forth in claim 4 wherein the banks are arranged to include outside banks more remote with respect to the window and inside banks more proximate with respect to the window.

6. The exchangeable illumination assembly as set forth in claim 5 wherein at least one of the LEDs project light in a different wavelength than others of the LEDs.

7. The exchangeable illumination assembly as set forth in claim 5 wherein the illumination component includes an aiming lighting element assembly proximate to the window.

8. The exchangeable illumination assembly as set forth in claim 1 wherein the fastening assembly comprises a plurality of threaded fasteners that engage threaded holes on a front face of the housing.

9. The exchangeable illumination assembly as set forth in claim 1 wherein the housing is constructed and arranged to removably mount lenses having a plurality of differing mounting base types and the illumination component is located so as to provide clearance for each of the lenses when mounted thereon.

10. The exchangeable illumination assembly as set forth in claim 9 wherein the illumination component includes a circuit board located at a spaced-apart relationship with respect to a front face of the housing.

11. The exchangeable illumination assembly as set forth in claim 10 wherein the lenses include a liquid lens having a liquid lens component located on the front face and being electrically interconnected to a connector located with respect to the housing.

12. The exchangeable illumination assembly as set forth in claim 1 further comprising an insert located between the light transmissive face of the cover and the lighting elements, the insert conditioning light as it passes therethrough.

13. The exchangeable illumination assembly as set forth in claim 1 wherein the window is constructed and arranged to at least one of (a) selectively filter or allow passage of predetermined wavelengths of light and (b) selectively block or allow passage of predetermined directions of light.

14. The exchangeable illumination assembly as set forth in claim 13 wherein the window includes one of a polarizer and a holographic diffuser.

15. The exchangeable illumination assembly as set forth in claim 1 wherein the lighting elements of the illumination component are arranged in a first illumination configuration and further comprising:

a second cover having a light-transmissive face and being exchangeable with the cover, the second cover enclosing another illumination component having a plurality of lighting elements in a second illumination configuration, the second cover including another connector assembly that removably interconnects processing circuitry that controls the lighting elements in the second illumination configuration to the housing, wherein the other illumination component is secured to the second cover.

16. The exchangeable illumination assembly as set forth in claim 1, the connector assembly further comprising a first connector element that provides power from the housing to the illumination assembly and a second connector element that provides control signals from the housing to the illumination assembly.

17. The exchangeable illumination assembly as set forth in claim 1, wherein the plurality of sidewalls define a rear-facing recess that faces the vision assembly such that the connector assembly can connect to corresponding housing connectors.

18. The exchangeable illumination assembly as set forth in claim 1, wherein the window is removable with the removable tapered wall assembly.

19. The exchangeable illumination assembly as set forth in claim 1, wherein the sealing member comprises an O-ring.

20. An exchangeable illumination assembly for a vision system having a housing that encloses optics and a sensor receiving light from the optics comprising:

a cover having a light-transmissive face that defines a forward-facing exterior surface of the cover, the cover having therein an illumination component having a plurality of lighting elements, the cover including a window through which light passes into the optics and the lighting elements arranged to direct light through the light-transmissive face at locations around the window, wherein the illumination component is secured to the cover via at least one fastener, wherein the cover comprises a plurality of sidewalls defining a multi-sided polygonal shape, the cover having a plurality of rearwardly directed walls defining a pocket, the pocket configured to receive a removable tapered wall assembly that nests within the plurality of rearwardly directed walls and that engages with the window, a rear side of the window engaging with a sealing member that seals the window with respect to the plurality of rearwardly directed walls;

a fastening assembly that removably secures at least two corners of the cover to the housing; and a connector assembly that removably interconnects processing circuitry that controls the lighting elements to the housing, the connector assembly comprising a first connector element that provides power from the housing to the illumination assembly and a second connector element that provides control signals from the housing to the illumination assembly.

21. The exchangeable illumination assembly as set forth in claim 20, wherein the sealing member comprises an O-ring.

22. An exchangeable illumination assembly for a vision system having a housing that encloses optics and a sensor receiving light from the optics comprising:

a cover having a light-transmissive face that defines a forward-facing exterior surface of the cover, the cover having therein an illumination component having a plurality of lighting elements, the cover including a window through which light passes into the optics and the lighting elements arranged to direct light through the light-transmissive face at locations around the window, wherein the illumination component is secured to the cover via at least one fastener, wherein the cover comprises a plurality of sidewalls, the sidewalls defining a multi-sided polygonal shape, the cover being configured to receive a removable tapered wall that engages with the window, a rear side of the window engaging with a sealing member that seals the window with respect to the cover;

a fastening assembly that removably secures at least two corners of the cover to the housing; and a connector assembly that removably interconnects processing circuitry that controls the lighting elements to the housing so that control signals and power from the housing are transmitted to the illumination assembly.

* * * * *